(12) United States Patent
Inchinose et al.

(10) Patent No.: US 7,666,955 B2
(45) Date of Patent: Feb. 23, 2010

(54) METHODS FOR PRODUCING BRANCHED-POLYETHER RESIN COMPOSITION AND ACID PENDANT BRANCHED-POLYETHER RESIN COMPOSITION

(75) Inventors: Eiju Inchinose, Ichihara (JP); Hideyuki Ishida, Ichihara (JP); Masatoshi Motomura, Ichihara (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 446 days.

(21) Appl. No.: 11/722,424

(22) PCT Filed: Dec. 20, 2005

(86) PCT No.: PCT/JP2005/023357

§ 371 (c)(1),
(2), (4) Date: Jun. 21, 2007

(87) PCT Pub. No.: WO2006/068134

PCT Pub. Date: Jun. 29, 2006

(65) Prior Publication Data

US 2009/0131622 A1   May 21, 2009

(30) Foreign Application Priority Data

Dec. 24, 2004   (JP)   ............................. 2004-373332

(51) Int. Cl.
*C08G 59/16* (2006.01)
*C08G 59/17* (2006.01)
*C08L 63/10* (2006.01)

(52) U.S. Cl. .................................. 525/531; 528/112
(58) Field of Classification Search .................. None
See application file for complete search history.

(56) References Cited

FOREIGN PATENT DOCUMENTS

| JP | 61-218620 A | | 9/1986 |
|---|---|---|---|
| JP | 2-110116 A | | 4/1990 |
| JP | 11-12345 A | * | 1/1999 |
| JP | 2001-094261 A | | 4/2001 |
| JP | 2001-247649 A | * | 9/2001 |

* cited by examiner

*Primary Examiner*—Robert Sellers
(74) *Attorney, Agent, or Firm*—Darby & Darby P.C.

(57) ABSTRACT

A method for producing a branched-polyether resin composition of the present invention includes
a first step of obtaining a reaction mixture including:
  (1-A) a branched-polyether resin (X) containing a hydroxyl group, an acryloyl group, and an epoxy group and
  (1-B) at least one resin component selected from the group consisting of
    (1-B-1) a diacrylate (A2) of an aromatic difunctional epoxy resin,
    (1-B-2) a monoacrylate (A1) of an aromatic difunctional epoxy resin, and
    (1-B-3) an aromatic difunctional epoxy resin (B) other than (A1) and (A2); and
a second step of mixing the reaction mixture and an unsaturated monocarboxylic acid, and reacting the epoxy group in the reaction mixture and a carboxyl group in the unsaturated monocarboxylic acid.

17 Claims, 3 Drawing Sheets

METHODS FOR PRODUCING BRANCHED-POLYETHER RESIN COMPOSITION AND ACID PENDANT BRANCHED-POLYETHER RESIN COMPOSITION

CROSS REFERENCE TO RELATED APPLICATIONS

This is a U.S. national phase application under 35 U.S.C. § 371 of International Patent Application No. PCT/JP2005/023357, filed Dec. 20, 2005, which claims the benefit of Japanese Patent Application No. 2004-373332, filed Dec. 24, 2004, both of which are incorporated by reference herein. The International Application was published in Japanese on Jun. 29, 2006 as International Publication No. WO 2006/068134 under PCT Article 21(2).

TECHNICAL FIELD

The present invention relates to a method for producing an acid pendant branched-polyether resin composition that can undergo both heat curing and energy ray curing, exhibits superior levels of tack-free drying properties during film formation, developing properties, and flexibility of the cured film, and is ideal for use within coating materials, inks and adhesives, and also relates to a method for producing a branched-polyether resin composition used in the above production.

BACKGROUND ART

Epoxy (meth)acrylate resins are widely used in coating materials, adhesives, inks, electronic substrates and sealing materials, either as heat-curable resins or activated energy ray-curable resins. For example, in a multilayer printed wiring board, which represents one example of an electronic substrate, in the case where an epoxy (meth)acrylate resin is used for improving the adhesion between the interlayer insulating layer and the semiconductor circuit layer, a resin composition has been proposed that includes a resin component containing an acid pendant epoxy (meth)acrylate resin obtained by reacting a novolak epoxy (meth)acrylate with an acid anhydride, and an epoxy resin as essential components (for example, see patent reference 1). However, although a cured product produced using this resin composition exhibits improved heat resistance, the tack-free drying properties during film formation, the developing properties, and the flexibility of the cured film are poor.

[Patent Reference 1]
Japanese Unexamined Patent Application, First Publication No. 2001-094261

DISCLOSURE OF INVENTION

An object of the present invention is to provide a method for producing a branched-polyether resin composition capable of forming coating materials or adhesives or the like that exhibit superior tack-free drying properties during film formation and excellent flexibility of the cured film, and also to provide a method for producing an acid pendant branched-polyether resin composition capable of forming resist inks and the like that exhibit superior levels of tack-free drying properties during film formation, developing properties, and flexibility of the cured film.

As a result of intensive investigation aimed at achieving the above object, the inventors of the present invention made the following findings (1) through (6).

(1) During the production of a monoacrylate of an aromatic difunctional epoxy resin and/or a diacrylate of an aromatic difunctional epoxy resin (an aromatic difunctional epoxy acrylate resin) by reacting an aromatic difunctional epoxy resin with acrylic acid, reaction can be conducted, in the presence of an organic solvent where necessary, so that the epoxy groups within the aromatic difunctional epoxy resin exist in an excess relative to the carboxyl groups within the acrylic acid, thereby consuming the acrylic acid within the reaction system and forming a reaction system containing the diacrylate of the aromatic difunctional epoxy resin, the monoacrylate of the aromatic difunctional epoxy resin, and/or unreacted aromatic difunctional epoxy resin. Moreover, if this reaction system is held in the presence of a phosphorus-based catalyst, then the hydroxyl groups within the monoacrylate of the aromatic difunctional epoxy resin and the diacrylate of the aromatic difunctional epoxy resin (namely, the hydroxyl groups produced by reaction between the epoxy groups within the aromatic difunctional epoxy resin and the carboxyl group within the acrylic acid) undergo repeated addition to the carbon-carbon double bonds within the acryloyl groups, causing an increase in molecular weight, and generating a novel branched-polyether resin (X) containing a hydroxyl group, an acryloyl group and an epoxy group. As a result, a resin composition [a reaction mixture (I)] that includes the branched-polyether resin (X), and one or more unreacted resin components selected from the group consisting of the diacrylate of the aromatic difunctional epoxy resin, the monoacrylate of the aromatic difunctional epoxy resin and the aromatic difunctional epoxy resin is obtained.

(2) By reacting the epoxy groups within the epoxy group-containing resin component of the above reaction mixture (I) (namely, the branched-polyether resin (X), the monoacrylate of the aromatic difunctional epoxy resin, and the aromatic difunctional epoxy resin) with the carboxyl group within an unsaturated monocarboxylic acid, a branched-polyether resin composition (II) that includes a novel branched-polyether resin (Y) containing a hydroxyl group and an unsaturated group, and the di(unsaturated monocarboxylate) ester of the aromatic difunctional epoxy resin can be produced with comparative ease. The thus obtained branched-polyether resin composition (II) exhibits excellent levels of stability, activated energy ray curability, tack-free curability during film formation, and flexibility of the resulting cured film.

(3) By mixing the branched-polyether resin composition (II) with a polycarboxylic acid anhydride, and reacting the hydroxyl groups within the branched-polyether resin composition (II) (namely, the hydroxyl groups within the branched-polyether resin (Y) and the di(unsaturated monocarboxylate) ester of the aromatic difunctional epoxy resin) with the acid anhydride groups within the polycarboxylic acid anhydride, an acid pendant branched-polyether resin composition (III) that includes an acid pendant branched-polyether resin (Z) and a di(unsaturated monocarboxylate) ester of an acid pendant aromatic difunctional epoxy resin can be produced with comparative ease. The acid pendant branched-polyether resin composition (III) can be developed using dilute aqueous alkali solutions, has both heat curability and energy ray curability, and exhibits excellent levels of tack-free drying properties during film formation, developing properties, and flexibility of the cured film.

(4) The addition reaction described in (1) above, of the hydroxyl groups within the monoacrylate of the aromatic difunctional epoxy resin and the diacrylate of the aromatic difunctional epoxy resin to the carbon-carbon double bond within the acryloyl groups in the presence of a phosphorus-based catalyst proceeds poorly if conducted without an excess of the epoxy groups within the aromatic difunctional epoxy resin relative to the carboxyl groups within the acrylic acid, if the reaction system does not contain the monoacrylate of the aromatic difunctional epoxy resin and/or an epoxy group-containing aromatic compound such as unreacted aromatic difunctional epoxy resin, or if methacrylic acid is used instead of acrylic acid.

(5) The method for producing the acid pendant branched-polyether resin composition (III) using the above reaction mixture (I) and the branched-polyether resin composition (II) offers considerable flexibility. For example, by varying factors such as the molecular weight of the aromatic difunctional epoxy resin, the molar ratio between the epoxy groups within the aromatic difunctional epoxy resin and the carboxyl groups within the acrylic acid, the quantity used of the phosphorus-based catalyst, the reaction temperature, or the reaction time, various properties of the branched-polyether resin (X) or the branched-polyether resin (Y) such as the molecular weight, the quantities of introduced hydroxyl groups, unsaturated groups and epoxy groups, the density of these introduced groups, and the ratios between the introduced groups can be varied over a broad range.

(6) The production of the reaction mixture (I) described in (I) above that employs an addition reaction of the hydroxyl groups within the monoacrylate of the aromatic difunctional epoxy resin and the diacrylate of the aromatic difunctional epoxy resin to the carbon-carbon double bond within the acryloyl groups proceeds provided the reaction system contains the diacrylate of the aromatic difunctional epoxy resin, together with the monoacrylate of the aromatic difunctional epoxy resin and/or the unreacted aromatic difunctional epoxy resin, as well as the phosphorus-based catalyst. As a result, production of the reaction mixture (I) need not necessarily be conducted as in (1) above, where the production is initiated by the reaction between the aromatic difunctional epoxy resin and acrylic acid and then continued in a consecutive manner, and for example, production can also be conducted using a separately prepared diacrylate of an aromatic difunctional epoxy resin (which may also include the monoacrylate of the aromatic difunctional epoxy resin and/or the aromatic difunctional epoxy resin), a separately prepared monoacrylate of an aromatic difunctional epoxy resin and/or an unreacted aromatic difunctional epoxy resin, and a phosphorus-based catalyst (wherein during reaction, the reaction system may also contain a monoacrylate of an aromatic monoepoxy resin and/or an aromatic monoepoxy compound).

The present invention is based on these findings.

In other words, the present invention provides a method for producing a branched-polyether resin composition that includes:

a first step of conducting a reaction within a mixture including:
(1-1) a diacrylate (A2) of an aromatic difunctional epoxy resin,
(1-2) (1-2-1) a monoacrylate (A1) of an aromatic difunctional epoxy resin, and/or
(1-2-2) an aromatic difunctional epoxy resin (B) other than (A1) and (A2), and
(1-3) a phosphorus-based catalyst (C), either between a hydroxyl group and an acryloyl group within the diacrylate (A2) of an aromatic difunctional epoxy resin, or between a hydroxyl group and an acryloyl group within the diacrylate (A2) of an aromatic difunctional epoxy resin and the monoacrylate (A1) of an aromatic difunctional epoxy resin, thereby obtaining a reaction mixture including:
(1-A) a branched-polyether resin (X) containing a hydroxyl group, an acryloyl group and an epoxy group, and
(1-B) at least one resin component selected from the group consisting of
(1-B-1) a diacrylate (A2) of an aromatic difunctional epoxy resin,
(1-B-2) a monoacrylate (A1) of an aromatic difunctional epoxy resin, and
(1-B-3) an aromatic difunctional epoxy resin (B) other than (A1) and (A2); and a second step of adding an unsaturated monocarboxylic acid to the above reaction mixture, and reacting epoxy groups in the reaction mixture with the carboxyl group in the unsaturated monocarboxylic acid.

In addition, the present invention also provides a method for producing an acid pendant branched-polyether resin composition that includes: mixing the branched-polyether resin composition obtained in the method for producing a branched-polyether resin composition described above with a polycarboxylic acid anhydride so as to react a hydroxyl group within the branched-polyether resin composition with an acid anhydride group within the polycarboxylic acid anhydride.

According to the present invention, there is provided a method for producing a branched-polyether resin composition that is capable of forming coating materials or adhesives or the like that exhibit superior tack-free drying properties during film formation, and excellent flexibility of the cured film. Furthermore, the present invention also provides a method for producing an acid pendant branched-polyether resin composition capable of forming resist inks and the like that exhibit superior levels of tack-free drying properties during film formation, developing properties, and flexibility of the cured film.

BEST MODE FOR CARRYING OUT THE INVENTION

Figure 1:
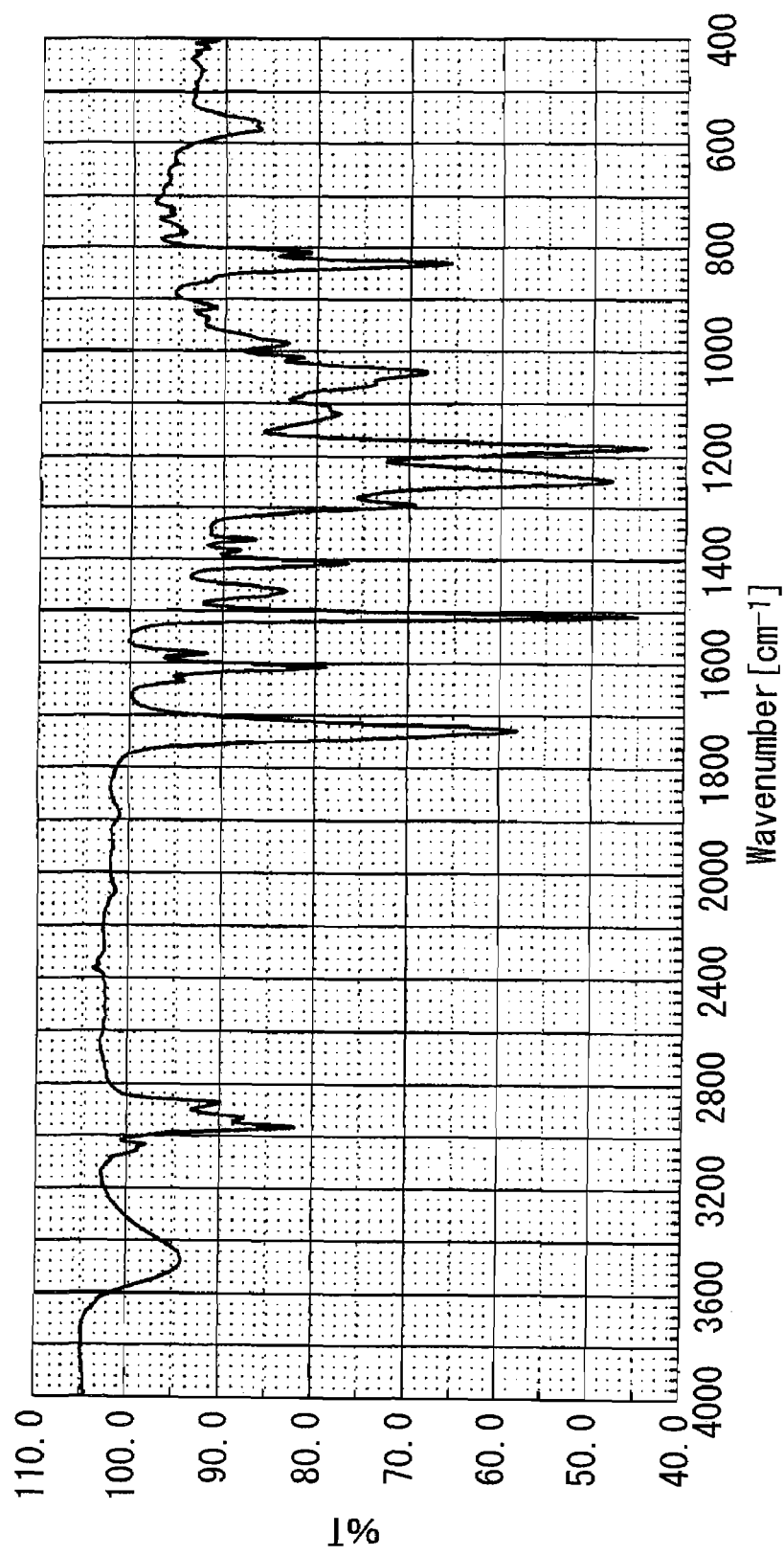
FIG. 1 is an infrared absorption spectrum for a resin material obtained in an example 2.

A first step within a method for producing a branched-polyether resin composition according to the present invention is a step that includes:

conducting a reaction within a mixture including:
(1-1) a diacrylate (A2) of an aromatic difunctional epoxy resin,
(1-2) (1-2-1) a monoacrylate (A1) of an aromatic difunctional epoxy resin, and/or
(1-2-2) an aromatic difunctional epoxy resin (B) other than (A1) and (A2), and
(1-3) a phosphorus-based catalyst (C), either between a hydroxyl group and an acryloyl group within the diacrylate (A2) of an aromatic difunctional epoxy resin, or between a hydroxyl group and an acryloyl group within the diacrylate (A2) of an aromatic difunctional epoxy resin and the monoacrylate (A1) of an aromatic difunctional epoxy resin, thereby obtaining a reaction mixture [hereafter referred to as the reaction mixture (I)] including:

(1-A) a branched-polyether resin (X) containing a hydroxyl group, an acryloyl group and an epoxy group, and (1-B) at least one resin component selected from the group consisting of (1-B-1) a diacrylate (A2) of an aromatic difunctional epoxy resin, (1-B-2) a monoacrylate (A1) of an aromatic difunctional epoxy resin, and (1-B-3) an aromatic difunctional epoxy resin (B) other than (A1) and (A2).

In the reaction mixture (I), the branched-polyether resin (X) containing a hydroxyl group, an acryloyl group and an epoxy group is the branched-polyether resin produced by reaction between a hydroxyl group and an acryloyl group within the diacrylate (A2) of an aromatic difunctional epoxy resin, or between a hydroxyl group and an acryloyl group within the diacrylate (A2) of an aromatic difunctional epoxy resin and the monoacrylate (A1) of an aromatic difunctional epoxy resin. Furthermore, in the reaction mixture (I), the one or more resin component selected from the group consisting of the diacrylate (A2) of an aromatic difunctional epoxy resin, the monoacrylate (A1) of an aromatic difunctional epoxy resin, and the aromatic difunctional epoxy resin (B) other than (A1) and (A2) represent unreacted resin components following the synthesis reaction of the branched-polyether resin (X) within the mixture (within the reaction system) containing the diacrylate (A2) of an aromatic difunctional epoxy resin, the monoacrylate (A1) of an aromatic difunctional epoxy resin and/or the aromatic difunctional epoxy resin (B), and the phosphorus-based catalyst (C).

The diacrylate (A2) of an aromatic difunctional epoxy resin used in the first step descried above is a compound obtained by acrylation of two epoxy groups within an aromatic difunctional epoxy resin (b) using acrylic acid (a). Examples of the aromatic difunctional epoxy resin (b) used in this reaction include biphenol epoxy resins such as tetramethylbiphenol epoxy resin; bisphenol epoxy resins such as bisphenol A epoxy resin, bisphenol F epoxy resin, and bisphenol S epoxy resin; dicyclopentadiene-modified aromatic difunctional epoxy resins; dihydroxynaphthalene epoxy resins obtained by epoxidation of a dihydroxynaphthalene; glycidyl ester resins of aromatic bivalent carboxylic acids; difunctional epoxy resins derived from xylenol and naphthalenearalkyl epoxy resins; epoxy resins obtained by modifying the above aromatic difunctional epoxy resins with dicyclopentadiene; and ester-modified epoxy resins obtained by modifying the above aromatic difunctional epoxy resins with a dicarboxylic acid.

Examples of the above ester-modified epoxy resins include resins obtained by conducting the modification under conditions in which the epoxy groups within the aromatic difunctional epoxy resin exist in excess relative to the carboxyl groups within the dicarboxylic acid. Examples of suitable dicarboxylic acids that can be used include dicarboxylic acids such as succinic acid, fumaric acid, phthalic acid, maleic acid, itaconic acid, adipic acid, azelaic acid, sebacic acid, isophthalic acid, terephthalic acid, tetrahydrophthalic acid, hexahydrophthalic acid, cyclohexanedicarboxylic acid and cyclohexenedicarboxylic acid, as well as dicarboxylic acid anhydrides such as maleic anhydride, phthalic anhydride, succinic anhydride, dodecenyl succinic anhydride, tetrahydrophthalic anhydride, 4-methyl-tetrahydrophthalic anhydride, 4-methyl-hexahydrophthalic anhydride and hexahydrophthalic anhydride.

The above dicarboxylic acid may use either one, or two or more compounds. Furthermore, an aromatic monocarboxylic acid such as benzoic acid or an aliphatic monocarboxylic acid such as propionic acid or stearic acid may be used as a portion of the above acid. In those cases where the aromatic difunctional epoxy resin is modified with a dicarboxylic acid, the molar quantity of the carboxylic acid must be smaller than the number of mols of epoxy groups so that residual epoxy groups are left within the molecule.

The aromatic difunctional epoxy resin (b) used in the preparation of the diacrylate (A2) of an aromatic difunctional epoxy resin may be either a single resin, or a combination of two or more different resins.

Examples of the monoacrylate (A1) of an aromatic difunctional epoxy resin and/or aromatic difunctional epoxy resin (B) used in the aforementioned step 1 include solely the monoacrylate (A1) of an aromatic difunctional epoxy resin obtained by acrylation with acrylic acid of one of the two epoxy groups within the above aromatic difunctional epoxy resin (b), solely the aromatic difunctional epoxy resin (b), or a mixture of both. The aromatic difunctional epoxy resin (b) used may be either the same as, or different from, the resin used in the preparation of the diacrylate (A2) of an aromatic difunctional epoxy resin. Furthermore, the aromatic difunctional epoxy resin (b) used in the preparation of the monoacrylate (A1) of an aromatic difunctional epoxy resin may be either a single resin, or a combination of two or more different resins.

In order to obtain the reaction mixture (I) via the first step, reaction may be conducted within a mixture including separately prepared samples of the diacrylate (A2) of an aromatic difunctional epoxy resin, the monoacrylate (A1) of an aromatic difunctional epoxy resin and/or an aromatic difunctional epoxy resin (B), and a phosphorus-based catalyst (C), if necessary in the presence of an organic solvent or a reactive diluent, either between a hydroxyl group and an acryloyl group within the diacrylate (A2) of an aromatic difunctional epoxy resin, or between a hydroxyl group and an acryloyl group within the diacrylate (A2) of an aromatic difunctional epoxy resin and the monoacrylate (A1) of an aromatic difunctional epoxy resin. The temperature during reaction is typically within a range from 100 to 170° C., and is preferably from 100 to 150° C. The reaction time is typically within a range from 1 to 20 hours, and is preferably from 2 to 15 hours. In this reaction, the separately prepared diacrylate (A2) of an aromatic difunctional epoxy resin may be a mixture that also contains the monoacrylate (A1) of an aromatic difunctional epoxy resin and/or the aromatic difunctional epoxy resin (B), and if required may also include a trifunctional or higher aromatic polyfunctional epoxy resin acrylate, provided the mixture does not gel. Moreover, the mixture may also contain a monoacrylate of an aromatic monoepoxy compound and/or an aromatic monoepoxy compound.

As described above, in order to obtain the reaction mixture (I), a mixture is used which contains the diacrylate (A2) of an aromatic difunctional epoxy resin, the monoacrylate (A1) of an aromatic difunctional epoxy resin and/or an aromatic difunctional epoxy resin (B), and a phosphorus-based catalyst (C), and if a reaction system containing the diacrylate (A2) of an aromatic difunctional epoxy resin, and the monoacrylate (A1) of an aromatic difunctional epoxy resin and/or an aromatic difunctional epoxy resin (B), obtained by reacting an aromatic difunctional epoxy resin (b) with acrylic acid (a) under conditions where the epoxy groups within the aromatic difunctional epoxy resin (b) exist in an excess relative to the carboxyl groups within the acrylic acid (a) (hereafter, this step may be abbreviated as "step 1"), is used for the mixture of (A2) and (A1) and/or (B), then the subsequent production of the reaction mixture (I) can be conducted in a consecutive manner, which is preferred.

In this step 1, in order to facilitate execution, the use of a reaction system containing the diacrylate (A2) of an aromatic difunctional epoxy resin and the monoacrylate (A1) of an aromatic difunctional epoxy resin [which may also include the unreacted aromatic difunctional epoxy resin (B)], that is, either a reaction system containing (A2) and (A1), or a reaction system containing (A2), (A1) and (B), is preferred.

In order to produce the above reaction mixture (I) using the reaction system obtained in the above step 1, either a hydroxyl group and an acryloyl group within the diacrylate (A2) of an aromatic difunctional epoxy resin within the reaction system, or a hydroxyl group and an acryloyl group within the diacrylate (A2) of an aromatic difunctional epoxy resin and the monoacrylate (A1) of an aromatic difunctional epoxy resin within the reaction system, are reacted together in the presence of a phosphorus-based catalyst (C). This reaction yields a reaction mixture that includes a branched-polyether resin (X) containing a hydroxyl group, an acryloyl group and an epoxy group, which is generated by a polymerization of the diacrylate (A2) of an aromatic difunctional epoxy resin, or the diacrylate (A2) of an aromatic difunctional epoxy resin and the monoacrylate (A1) of an aromatic difunctional epoxy resin, together with at least one unreacted resin component selected from the group consisting of the diacrylate (A2) of an aromatic difunctional epoxy resin, the monoacrylate (A1) of an aromatic difunctional epoxy resin, and the aromatic difunctional epoxy resin (B) (hereafter, this step may be abbreviated as "step 2").

The introduction of a phosphorus-based catalyst (C) into the reaction system obtained in the step 1 to generate a mixture containing the diacrylate (A2) of an aromatic difunctional epoxy resin, the monoacrylate (A1) of an aromatic difunctional epoxy resin and/or the aromatic difunctional epoxy resin (B), and the phosphorus-based catalyst (C) can be conducted, for example, using the preferred methods described below.

Method 1: The phosphorus-based catalyst (C) is added following completion of the aforementioned step 1. Specifically, the mixture is obtained by reacting an aromatic difunctional epoxy resin (b) with acrylic acid (a) under conditions where the epoxy groups within the aromatic difunctional epoxy resin (b) exist in an excess relative to the carboxyl groups within the acrylic acid (a), thereby forming a reaction system including:
  (1-1) a diacrylate (A2) of an aromatic difunctional epoxy resin, and
  (1-2) (1-2-1) a monoacrylate (A1) of an aromatic difunctional epoxy resin, and/or
    (1-2-2) an aromatic difunctional epoxy resin (B) other than (A1) and (A2), and subsequently adding the phosphorus-based catalyst (C) to this reaction system.

Method 2: The phosphorus-based catalyst (C) is added during the reaction of the aforementioned step 1. Specifically, the mixture is obtained by reacting an aromatic difunctional epoxy resin (b) with acrylic acid (a) in the presence of the phosphorus-based catalyst (C), under conditions where the epoxy groups within the aromatic difunctional epoxy resin (b) exist in an excess relative to the carboxyl groups within the acrylic acid (a).

In the present invention, the above method 2 is preferably used for obtaining the mixture used in the first step.

The aromatic difunctional epoxy resin (B) used in the present invention is an epoxy resin other than the aforementioned (A1) and (A2). In the step 1, the aromatic difunctional epoxy resin (b) is reacted with acrylic acid (a) under conditions where the epoxy groups within the aromatic difunctional epoxy resin (b) exist in an excess relative to the carboxyl groups within the acrylic acid (a), and consequently some of the aromatic difunctional epoxy resin (b) remains within the reaction system without reacting with the acrylic acid (a). This residual aromatic difunctional epoxy resin (b) is different from the diacrylate (A2) of an aromatic difunctional epoxy resin or the monoacrylate (A1) of an aromatic difunctional epoxy resin, which represent reaction products of the aromatic difunctional epoxy resin (b) and the acrylic acid (a). Accordingly, this residual aromatic difunctional epoxy resin (b) functions as the aromatic difunctional epoxy resin (B) other than (A1) and (A2).

Examples of the phosphorus-based catalyst (C) used in the present invention include phosphines and phosphonium salts. Of these, phosphines are the most desirable.

Examples of suitable phosphines include trialkylphosphines, triphenylphosphine, and trialkylphenylphosphines, and of these, triphenylphosphine is particularly desirable as it facilitates reaction control.

In terms of the quantity used of the phosphorus-based catalyst (C), the reaction within the mixture between a hydroxyl group and an acryloyl group within the diacrylate (A2) of an aromatic difunctional epoxy resin and the monoacrylate (A1) of an aromatic difunctional epoxy resin proceeds more readily as the quantity of catalyst is increased, but as larger catalyst quantities also increase the likelihood of gelling and cause a deterioration in the stability of the composition, the quantity of the catalyst is preferably within a range from 10 to 30,000 ppm relative to the combined weight of the aromatic difunctional epoxy resin (b) and the acrylic acid (a).

As the aromatic difunctional epoxy resin (b) and the aromatic difunctional epoxy resin (B), resins in which the epoxy equivalent weight is within a range from 135 to 2,000 g/equivalent, and particularly from 135 to 500 g/equivalent, are preferred as they yield resin compositions with superior curability. Furthermore, because they yield resin compositions for which the cured product exhibits excellent mechanical strength, biphenol epoxy resins such as tetramethylbiphenol epoxy resin; bisphenol epoxy resins such as bisphenol A epoxy resin, bisphenol F epoxy resin, and bisphenol S epoxy resin; and dihydroxynaphthalene epoxy resins obtained by epoxidation of a dihydroxynaphthalene are preferred, bisphenol A epoxy resin or 1,6-dihydroxynaphthalene epoxy resin is even more preferred, and bisphenol A epoxy resin is the most desirable.

In this description, an aromatic difunctional epoxy resin with an epoxy equivalent weight within a range from 135 to 500 g/equivalent is referred to as an aromatic difunctional epoxy resin (B1).

When the reaction mixture (I) is produced via the aforementioned step 1 and step 2, instead of using an ester-modified aromatic difunctional epoxy resin, prepared by modifying an aromatic difunctional epoxy resin with a dicarboxylic acid, as the aromatic difunctional epoxy resin (b), modification of the aromatic difunctional epoxy resin (b) with a dicarboxylic acid may also be conducted by adding a modifying dicarboxylic acid to the mixture of the aromatic difunctional epoxy resin (b) and the acrylic acid (a).

In the above step 1, there are no particular restrictions on the degree of excess of the epoxy groups within the aromatic difunctional epoxy resin (b) relative to the carboxyl groups within the acrylic acid (a), although in order to ensure that, in the step 2, the reaction between a hydroxyl group and an acryloyl group within the diacrylate (A2) of an aromatic difunctional epoxy resin, or the reaction between a hydroxyl group and an acryloyl group within the diacrylate (A2) of an aromatic difunctional epoxy resin and the monoacrylate (A1) of an aromatic difunctional epoxy resin proceeds smoothly, the equivalence ratio between the epoxy groups within the aromatic difunctional epoxy resin (b) and the carboxyl groups within the acrylic acid (a) [namely, (epoxy group equivalent weight)/(carboxyl group equivalent weight)] is preferably within a range from 1.1 to 5.5. Furthermore, in terms of facilitating molecular weight modification of the obtained branched-polyether resin composition, this equivalence ratio [(epoxy group equivalent weight)/(carboxyl group equivalent weight)] is most preferably within a range from 1.25 to 3.0.

It is thought that the reactions initiated by the reaction between the aforementioned aromatic difunctional epoxy resin (b) and acrylic acid (a) proceed via a reaction scheme shown in the drawing below.

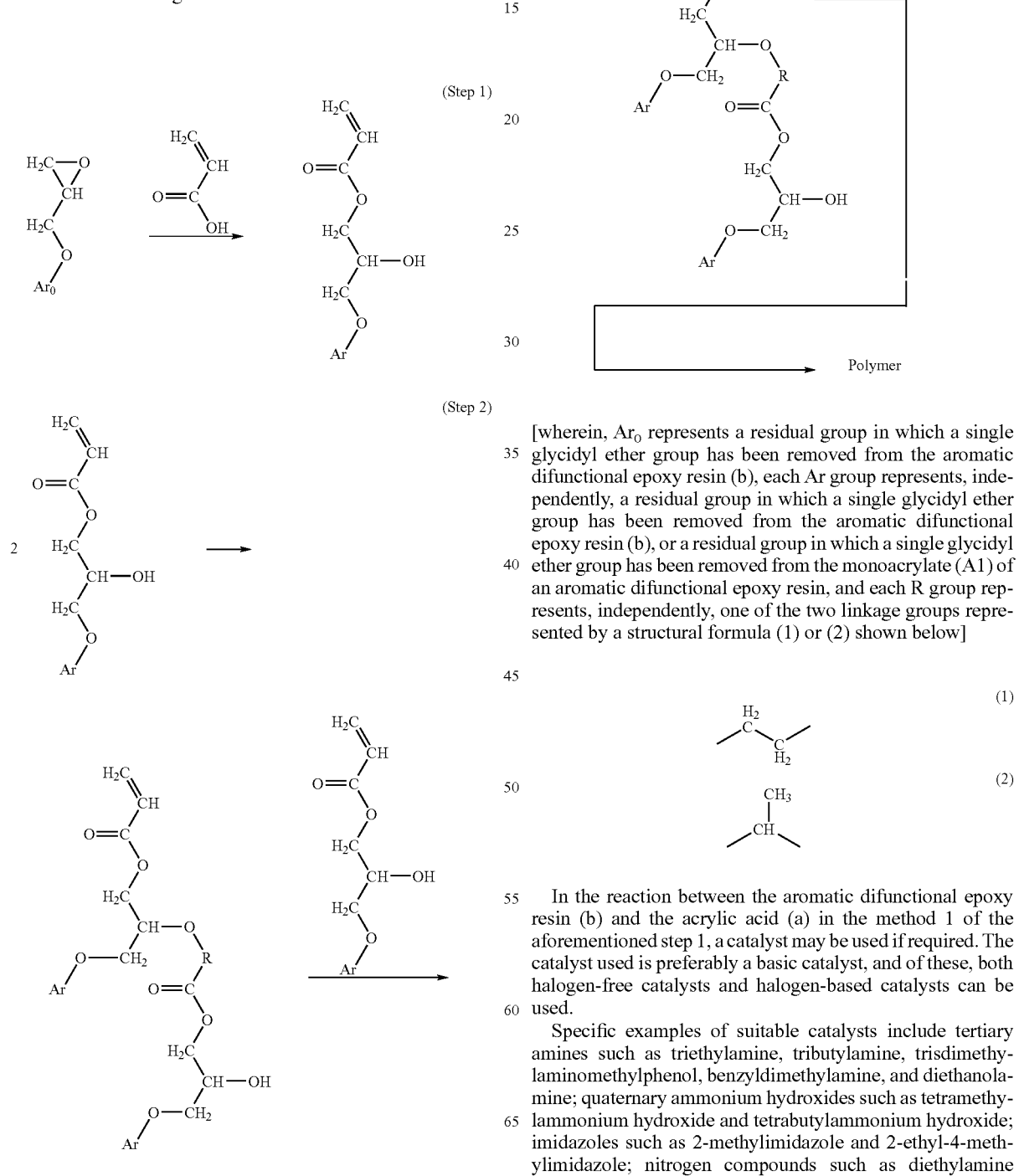

[wherein, $Ar_0$ represents a residual group in which a single glycidyl ether group has been removed from the aromatic difunctional epoxy resin (b), each Ar group represents, independently, a residual group in which a single glycidyl ether group has been removed from the aromatic difunctional epoxy resin (b), or a residual group in which a single glycidyl ether group has been removed from the monoacrylate (A1) of an aromatic difunctional epoxy resin, and each R group represents, independently, one of the two linkage groups represented by a structural formula (1) or (2) shown below]

In the reaction between the aromatic difunctional epoxy resin (b) and the acrylic acid (a) in the method 1 of the aforementioned step 1, a catalyst may be used if required. The catalyst used is preferably a basic catalyst, and of these, both halogen-free catalysts and halogen-based catalysts can be used.

Specific examples of suitable catalysts include tertiary amines such as triethylamine, tributylamine, trisdimethylaminomethylphenol, benzyldimethylamine, and diethanolamine; quaternary ammonium hydroxides such as tetramethylammonium hydroxide and tetrabutylammonium hydroxide; imidazoles such as 2-methylimidazole and 2-ethyl-4-methylimidazole; nitrogen compounds such as diethylamine hydrochloride and diazabicycloundecene; trialkylphosphines such as triphenylphosphine; tetraalkylphosphonium hydroxides such as tetra-n-butylphosphonium hydroxide; metal salts such as chromium naphthenate; halogen-based catalysts, including quaternary ammonium salts such as trimethylbenzylammonium chloride and tetramethylammonium chloride, and phosphonium salts such as tetra-n-butylphosphonium bromide and ethyltriphenylphosphonium bromide; and inorganic catalysts such as sodium hydroxide and lithium hydroxide.

Of these catalysts; halogen-free catalysts are preferred, and nitrogen compounds such as tertiary amines and quaternary ammonium salts, and phosphorus-based catalysts such as phosphines and phosphonium salts are particularly preferred. Of these, phosphorus-based catalysts such as phosphines and phosphonium salts are particularly desirable as they can be used as the catalyst that is required in the first step, and phosphines are the most desirable.

Specific examples of these phosphines include trialkylphosphines, triphenylphosphine, and trialkylphenylphosphines, and of these, triphenylphosphine is particularly desirable as it facilitates reaction control.

In terms of the quantity used of the above catalyst, the reactions of the aforementioned steps 1 and 2 proceed more readily as the quantity of catalyst is increased, but as larger catalyst quantities also increase the likelihood of gelling and cause a deterioration in the stability of the composition, the quantity of the catalyst is preferably within a range from 10 to 30,000 ppm relative to the combined weight of the aromatic difunctional epoxy resin (b) and the acrylic acid (a). Furthermore, in the case of a phosphorus-based catalyst, the catalyst used in the step 1 can simply be used, as is, within the step 2, or an additional quantity of the catalyst or a different phosphorus-based catalyst can be added at step 2 or added during the reaction.

In the step 1, reaction is usually conducted by stirring at a temperature within a range from 70 to 170° C., and preferably from 100 to 150° C. At this point, polymerization inhibitors or antioxidants may be used, and examples of suitable polymerization inhibitors include hydroquinone, methylhydroquinone, trimethylhydroquinone, tertiarybutylquinone, 2,6-di-tertiary-butyl-4-methoxyphenol, copper salts, and phenothiazine. Furthermore, examples of suitable antioxidants include phosphorous acid, phosphite esters, and phosphite diesters.

In the above step 1, during the reaction between the aromatic difunctional epoxy resin (b) and the acrylic acid (a), the reaction between a hydroxyl group and a carbon-carbon double bond of the acryloyl group is almost non-existent, but at the end point of the reaction of the step 1, where the carboxyl groups of the acrylic acid (a) have been consumed by reaction with the epoxy groups within the aromatic difunctional epoxy resin (b), the reaction between a hydroxyl group and a carbon-carbon double bond of the acryloyl group proceeds, thereby forming ether linkages and causing a polymerization that represents the beginning of the step 2.

In the step 2, reaction occurs within the mixture containing the diacrylate (A2) of an aromatic difunctional epoxy resin, the monoacrylate (A1) of an aromatic difunctional epoxy resin and/or the aromatic difunctional epoxy resin (B), and the phosphorus-based catalyst (C), with reaction occurring between either a hydroxyl group and the carbon-carbon double bond of an acryloyl group within the diacrylate (A2) of an aromatic difunctional epoxy resin, or between a hydroxyl group and the carbon-carbon double bond of an acryloyl group within the diacrylate (A2) of an aromatic difunctional epoxy resin and the monoacrylate (A1) of an aromatic difunctional epoxy resin. As a result, a novel branched-polyether resin (X) containing a hydroxyl group, an acryloyl group and an epoxy group is obtained, which is generated by polymerization of the diacrylate (A2) of an aromatic difunctional epoxy resin or by polymerization of the diacrylate (A2) of an aromatic difunctional epoxy resin and the monoacrylate (A1) of an aromatic difunctional epoxy resin. This reaction system becomes the reaction mixture (I) that includes the branched-polyether resin (X), together with one or more unreacted resin components selected from the group consisting of the diacrylate (A2) of the aromatic difunctional epoxy resin, the monoacrylate (A1) of the aromatic difunctional epoxy resin, and the aromatic difunctional epoxy resin (B).

However, as described above, the mixture used in the step 1 is preferably a mixture containing the diacrylate (A2) of an aromatic difunctional epoxy resin and the monoacrylate (A1) of an aromatic difunctional epoxy resin [which may also include the unreacted aromatic difunctional epoxy resin (B)]. In other words, either a mixture containing (A2) and (A1), or a mixture containing (A2), (A1) and (B), is preferred. By using one of these mixtures and then executing the step 2, a reaction mixture described below can be obtained.

When a mixture containing (A2) and (A1) is used as the above mixture, a reaction mixture is obtained that includes:

(1-A) a branched-polyether resin (X) containing a hydroxyl group, an acryloyl group and an epoxy group, and (1-B) at least one resin component selected from the group consisting of (1-B-1) a diacrylate (A2) of an aromatic difunctional epoxy resin, and (1-B-2) a monoacrylate (A1) of an aromatic difunctional epoxy resin.

When a mixture containing (A2), (A1) and (B) is used as the above mixture, a reaction mixture is obtained that includes:

(1-A) a branched-polyether resin (X) containing a hydroxyl group, an acryloyl group and an epoxy group, and (1-B) at least one resin component selected from the group consisting of (1-B-1) a diacrylate (A2) of an aromatic difunctional epoxy resin, (1-B-2) a monoacrylate (A1) of an aromatic difunctional epoxy resin, and (1-B-3) an aromatic difunctional epoxy resin (B) other than (A1) and (A2).

The reaction between a hydroxyl group and the carbon-carbon double bond of an acryloyl group in the step 2 does not occur in the absence of an epoxy group-containing aromatic compound such as the monoacrylate (A1) of an aromatic difunctional epoxy resin or the aromatic difunctional epoxy resin (B). It is thought that the reason for this observation is that the epoxy group-containing aromatic compound functions as one type of catalyst for the reaction between the hydroxyl group and the carbon-carbon double bond of an acryloyl group.

Subsequently, the production method proceeds to the second step. The second step includes mixing the reaction mixture (I) obtained in the first step with an unsaturated monocarboxylic acid, and reacting epoxy groups in the reaction mixture with the carboxyl group in the unsaturated monocarboxylic acid. By reacting the epoxy groups in the above reaction mixture (I) with the carboxyl group in the unsaturated monocarboxylic acid, the majority of, or all of, the epoxy groups are consumed, thereby yielding a branched-polyether resin (Y) containing a hydroxyl group and an acryloyl group-containing unsaturated monocarboxylate ester structure, so that the reaction system forms a branched-polyether resin composition (II) containing the branched-polyether resin (Y) and a di(unsaturated monocarboxylate) ester of an aromatic difunctional epoxy resin (hereafter this step is also abbreviated as "step 3").

Because the reaction mixture (I) includes the branched-polyether resin (X) that contains a hydroxyl group, an acryloyl group and an epoxy group, together with one or more resin components selected from the group consisting of the diacrylate (A2) of an aromatic difunctional epoxy resin, the monoacrylate (A1) of an aromatic difunctional epoxy resin, and an aromatic epoxy compound (B), the structures that undergo actual reaction with the carboxyl group of the unsaturated monocarboxylic acid are the epoxy group within the branched-polyether resin (X), the epoxy group within the monoacrylate (A1) of an aromatic difunctional epoxy resin, and the epoxy group within the aromatic epoxy compound (B).

Accordingly, the branched-polyether resin composition (II) obtained in the above step 3 includes the branched-polyether resin (X), the branched-polyether resin (Y) containing a hydroxyl group and an acryloyl group-containing unsaturated monocarboxylate ester structure, which represents a reaction product of the unsaturated monocarboxylic acid, together with one or more di(unsaturated monocarboxylate) esters of aromatic difunctional epoxy resins selected from the group consisting of the di(unsaturated monocarboxylate) ester of an aromatic difunctional epoxy resin that represents the reaction product of the monoacrylate (A1) of an aromatic difunctional epoxy resin and the unsaturated monocarboxylic acid, the di(unsaturated monocarboxylate) ester of an aromatic difunctional epoxy resin that represents the reaction product of the aromatic difunctional epoxy resin (B) and the unsaturated monocarboxylic acid, and the diacrylate (A2) of an aromatic difunctional epoxy resin. In those cases where the unsaturated monocarboxylic acid is (meth)acrylic acid, the branched-polyether resin composition (II) includes a branched-polyether resin (Y1) containing a hydroxyl group and a (meth)acryloyl group, and a di(unsaturated monocarboxylate) ester of an aromatic difunctional epoxy resin.

Examples of the unsaturated monocarboxylic acid used in the second step (the aforementioned step 3) include compounds or the like containing one polymerizable unsaturated group and one carboxyl group, and specific examples include acrylic acid, methacrylic acid, crotonic acid, cinnamic acid, monomethyl maleate, monoethyl maleate, monopropyl maleate, monobutyl maleate, mono(2-ethylhexyl) maleate, and sorbic acid, although other compounds including unsaturated half ester compounds obtained by reaction between a (meth)acrylate compound containing a hydroxyl group and a dicarboxylic acid anhydride, such as hydroxyethyl (meth)acrylate, hydroxypropyl (meth)acrylate, hydroxybutyl (meth)acrylate, hydroxycyclohexyl (meth)acrylate, pentaerythritol tri(meth)acrylate and dipentaerythritol penta(meth)acrylate, lactone-modified unsaturated monocarboxylic acids obtained by reaction between a compound containing one polymerizable unsaturated group and one carboxyl group with ε-caprolactone, and acrylic acid dimer may also be used. Of these compounds, acrylic acid and/or methacrylic acid are preferred.

In the second step (the aforementioned step 3), conducting the reaction between the above reaction mixture (I) and the unsaturated monocarboxylic acid so that the equivalence ratio between the epoxy groups within the reaction mixture (I) and the carboxyl groups within the unsaturated monocarboxylic acid (epoxy groups/carboxyl groups) is within a range from 0.9/1 to 1/0.9 is preferred in terms of obtaining a branched-polyether resin composition (II) with superior levels of long-term stability and curability. Moreover, in the above step 3, the use of acrylic acid and/or methacrylic acid as the unsaturated monocarboxylic acid is particularly desirable as it yields a branched-polyether resin composition (II) with excellent activated energy ray curability.

In the aforementioned second step (the step 3), the reaction temperature is typically within a range from 80 to 160° C., although reaction temperatures from 100 to 140° C. are preferred as they provide superior stability during synthesis. Furthermore the reaction time for the step 3 is typically within a range from 1 to 20 hours, and is preferably from 2 to 15 hours. During the reaction, an aforementioned catalyst may be added as a reaction catalyst.

Moreover, in the aforementioned first step, the use of a mixture containing methacryloyl groups as the mixture enables the production of a branched-polyether resin composition with excellent heat resistance, and is consequently preferred.

In order to obtain a reaction mixture (I') using a mixture containing methacryloyl groups, a mixture is used which contains, for example, a di(meth)acrylate (A2') of an aromatic difunctional epoxy resin, a mono(meth)acrylate (A1') of an aromatic difunctional epoxy resin and/or an aromatic difunctional epoxy resin (B'), and a phosphorus-based catalyst (C), and if a reaction system containing the di(meth)acrylate (A2') of an aromatic difunctional epoxy resin, and the mono(meth)acrylate (A1') of an aromatic difunctional epoxy resin and/or an aromatic difunctional epoxy resin (B'), obtained by reacting the aforementioned aromatic difunctional epoxy resin (b) with acrylic acid (a) and methacrylic acid (a') under conditions where the epoxy groups within the aromatic difunctional epoxy resin (b) exist in an excess relative to the combined total of carboxyl groups within the acrylic acid (a) and the methacrylic acid (a') (hereafter, this step may be abbreviated as step 1'), is used for the mixture of (A2') and (A1') and/or (B'), then the subsequent production of the reaction mixture (I') can be conducted in a consecutive manner, which is preferred. Here, the aromatic difunctional epoxy resin (B') is an aromatic difunctional epoxy resin other than the aforementioned (A2') and (A1'). The term "(meth)acrylate" is a generic term that includes both the acrylate and the methacrylate.

In this step 1', in order to facilitate execution, the use of a reaction system containing the di(meth)acrylate (A2') of an aromatic difunctional epoxy resin and the mono(meth)acrylate (A1') of an aromatic difunctional epoxy resin [which may also include the unreacted aromatic difunctional epoxy resin (B')], that is, either a reaction system containing (A2') and (A1'), or a reaction system containing (A2'), (A1') and (B'), is preferred.

In order to produce the above reaction mixture (I') using the reaction system obtained in the above step 1', either a hydroxyl group and an acryloyl group within the di(meth)acrylate (A2') of an aromatic difunctional epoxy resin within the reaction system, or a hydroxyl group and an acryloyl group within the di(meth)acrylate (A2') of an aromatic difunctional epoxy resin and the mono(meth)acrylate (A1') of an aromatic difunctional epoxy resin within the reaction system, are reacted together in the presence of a phosphorus-based catalyst (C), yielding a reaction mixture that includes a branched-polyether resin (X) containing a hydroxyl group, an acryloyl group and an epoxy group, which is generated by a polymerization of the di(meth)acrylate (A2') of an aromatic difunctional epoxy resin, or a polymerization of the di(meth)

acrylate (A2') of an aromatic difunctional epoxy resin and the mono(meth)acrylate (A1') of an aromatic difunctional epoxy resin, together with at least one unreacted resin component selected from the group consisting of the di(meth)acrylate (A2') of an aromatic difunctional epoxy resin, the mono (meth)acrylate (A1') of an aromatic difunctional epoxy resin, and the aromatic difunctional epoxy resin (B') (hereafter, this step may be abbreviated as step 2').

The introduction of a phosphorus-based catalyst (C) into the reaction system obtained in the step 1' to generate a mixture containing the di(meth)acrylate (A2') of an aromatic difunctional epoxy resin, the mono(meth)acrylate (A1') of an aromatic difunctional epoxy resin and/or the aromatic difunctional epoxy resin (B), and the phosphorus-based catalyst (C) can be conducted, for example, using the preferred methods described below.

Method 3: The phosphorus-based catalyst (C) is added following completion of the aforementioned step 1'. Specifically, the mixture is obtained by reacting an aromatic difunctional epoxy resin (b) with acrylic acid (a) and methacrylic acid (a') under conditions where the epoxy groups within the aromatic difunctional epoxy resin (b) exist in an excess relative to the combined total of the carboxyl groups within the acrylic acid (a) and methacrylic acid (a'), thereby forming a reaction system including:
- (1-1) a di(meth)acrylate (A2') of an aromatic difunctional epoxy resin, and
- (1-2) (1-2-1) a mono(meth)acrylate (A1') of an aromatic difunctional epoxy resin, and/or
  - (1-2-2) an aromatic difunctional epoxy resin (B') other than (A1') and (A2'), and subsequently adding the phosphorus-based catalyst (C) to this reaction system.

Method 4: The phosphorus-based catalyst (C) is added during the reaction of the aforementioned step 1'. Specifically, the mixture is obtained by reacting an aromatic difunctional epoxy resin (b) with acrylic acid (a) and methacrylic acid (a') in the presence of the phosphorus-based catalyst (C), under conditions where the epoxy groups within the aromatic difunctional epoxy resin (b) exist in an excess relative to the combined total of the carboxyl groups within the acrylic acid (a) and methacrylic acid (a').

In the present invention, the above method 4 is preferably used for obtaining the mixture used in the first step.

The above aromatic difunctional epoxy resin (B') is an epoxy resin other than the aforementioned (A1') and (A2'). In the step 1', the aromatic difunctional epoxy resin (b) is reacted with acrylic acid (a) and methacrylic acid (a') under conditions where the epoxy groups within the aromatic difunctional epoxy resin (b) exist in an excess relative to the combined total of the carboxyl groups within the acrylic acid (a) and methacrylic acid (a'), and consequently some of the aromatic difunctional epoxy resin (b) remains within the reaction system without reacting with the acrylic acid (a) or methacrylic acid (a'). This residual aromatic difunctional epoxy resin (b) is different from the di(meth)acrylate (A2') of an aromatic difunctional epoxy resin or the mono(meth)acrylate (A1') of an aromatic difunctional epoxy resin, which represent reaction products of the aromatic difunctional epoxy resin (b) with the acrylic acid (a) and the methacrylic acid (a'). Accordingly, this residual aromatic difunctional epoxy resin (b) functions as an aromatic difunctional epoxy resin (B') other than (A1') and (A2').

In the above step 1', there are no particular restrictions on the degree of excess of the epoxy groups within the aromatic difunctional epoxy resin (b) relative to the combined total of the carboxyl groups within the acrylic acid (a) and methacrylic acid (a'), although in order to ensure that, in the step 2', the reaction between a hydroxyl group and an acryloyl group within the di(meth)acrylate (A2') of an aromatic difunctional epoxy resin within the reaction system and the mono(meth) acrylate (A1') of an aromatic difunctional epoxy resin proceeds smoothly, the equivalence ratio between the epoxy groups within the aromatic difunctional epoxy resin (b) and the carboxyl groups within the combination of the acrylic acid (a) and the methacrylic acid (a') [namely, (epoxy group equivalent weight)/(carboxyl group equivalent weight)] is preferably within a range from 1.1 to 5.5. Furthermore, in terms of facilitating molecular weight modification of the obtained branched-polyether resin composition, this equivalence ratio [(epoxy group equivalent weight)/(carboxyl group equivalent weight)] is most preferably within a range from 1.25 to 3.0.

However, as described above, the mixture used in the step 1' is preferably a mixture containing the di(meth)acrylate (A2') of an aromatic difunctional epoxy resin and the mono (meth)acrylate (A1') of an aromatic difunctional epoxy resin [which may also include the unreacted aromatic difunctional epoxy resin (B')]. In other words, either a mixture containing (A2') and (A1'), or a mixture containing (A2'), (A1') and (B'), is preferred. By using one of these mixtures and then executing the step 2, a reaction mixture described below can be obtained.

When a mixture containing (A2') and (A1') is used as the above mixture, a reaction mixture is obtained that includes:
- (1-A) a branched-polyether resin (X) containing a hydroxyl group, an acryloyl group and an epoxy group, and
- (1-B) at least one resin component selected from the group consisting of
  - (1-B-1) a di(meth)acrylate (A2') of an aromatic difunctional epoxy resin, and
  - (1-B-2) a mono(meth)acrylate (A1') of an aromatic difunctional epoxy resin.

When a mixture containing (A2'), (A1') and (B') is used as the above mixture, a reaction mixture is obtained that includes:
- (1-A) a branched-polyether resin (X) containing a hydroxyl group, an acryloyl group and an epoxy group, and
- (1-B) at least one resin component selected from the group consisting of
  - (1-B-1) a di(meth)acrylate (A2') of an aromatic difunctional epoxy resin,
  - (1-B-2) a mono(meth)acrylate (A1') of an aromatic difunctional epoxy resin, and
  - (1-B-3) an aromatic difunctional epoxy resin (B') other than (A1') and (A2').

During the reaction of hydroxyl groups and acryloyl groups within the di(meth)acrylate (A2') of an aromatic difunctional epoxy resin and the mono(meth)acrylate (A1') of an aromatic difunctional epoxy resin, the methacryloyl groups do not react with the hydroxyl groups. Accordingly, the generated branched-polyether resin (X) is obtained via the same reaction mechanism as that described above for the system containing no methacryloyl groups.

Subsequently, in order to impart photopatterning capabilities, the branched-polyether resin composition (II) obtained using the production method of the present invention is mixed with a polycarboxylic acid anhydride, and the hydroxyl groups within the branched-polyether resin composition (II) [namely, the hydroxyl groups within the branched-polyether resin (Y) and the hydroxyl groups within the di(unsaturated monocarboxylate) ester of an aromatic difunctional epoxy resin] undergo reaction with the acid anhydride groups within the polycarboxylic acid anhydride. As a result, an acid pendant branched-polyether resin composition (III) containing an acid pendant branched-polyether resin (Z) and an acid pendant aromatic difunctional epoxy resin di(unsaturated monocarboxylate) ester can be obtained (hereafter, this step may be abbreviated as "step 4").

Examples of the above polycarboxylic acid anhydride include maleic anhydride, phthalic anhydride, succinic anhydride, dodecenyl succinic anhydride, tetrahydrophthalic anhydride, 4-methyl-tetrahydrophthalic anhydride, 4-methyl-hexahydrophthalic anhydride, hexahydrophthalic anhydride, trimellitic anhydride, methylnadic anhydride, itaconic anhydride, pyromellitic anhydride, and benzophenone tetracarboxylic anhydride, and of these, dicarboxylic acid anhydrides are preferred as they yield an acid pendant branched-polyether resin composition (III) with superior developing properties, and aliphatic polycarboxylic acid anhydrides (including cyclic aliphatic polycarboxylic acid anhydrides) are particularly desirable.

Examples of the above aliphatic polycarboxylic acid anhydrides include maleic anhydride, succinic anhydride, dodecenyl succinic anhydride, tetrahydrophthalic anhydride, 4-methyl-tetrahydrophthalic anhydride, 4-methyl-hexahydrophthalic anhydride, hexahydrophthalic anhydride and itaconic anhydride.

The reaction ratio of the polycarboxylic acid anhydride relative to the branched-polyether resin composition (II) obtained using the production method of the present invention is preferably within a range from 0.1 to 1 mol per 1 mol of epoxy groups within the branched-polyether resin composition.

The reaction that occurs in the aforementioned step 4 between the hydroxyl groups within the branched-polyether resin composition (II) and the acid anhydride groups within the polycarboxylic acid anhydride is an esterification reaction that proceeds via a ring opening of the acid anhydride group, in which a single acid anhydride group reacts with a single hydroxyl group. The reaction temperature is typically within a range from 50 to 160° C., although reaction temperatures from 80 to 120° C. are preferred as they provide superior stability during synthesis. Furthermore the reaction time for the step 4 is typically within a range from 1 to 20 hours, and is preferably from 2 to 10 hours.

The acid pendant branched-polyether resin composition (III) obtained in this manner contains introduced carboxyl groups within the resin component, and can therefore be dissolved in dilute aqueous alkali solutions. As a result, if the composition is irradiated with an activated energy ray of ultraviolet light or the like through a mask having a desired pattern, the regions that are irradiated with the ultraviolet light undergo a curing reaction and become insoluble in dilute aqueous alkali solutions (can not be developed). In contrast, those regions that are not irradiated with the ultraviolet light due to the mask can be dissolved (developed) in a dilute aqueous alkali solution. In other words, by using an acid pendant branched-polyether resin composition (III) obtained using the production method of the present invention, a negative pattern that represents an inversion of the desired pattern can be obtained.

When using the above step 4 to generate the acid pendant branched-polyether resin composition (III), the reaction between the hydroxyl groups within the branched-polyether resin composition (II) and the polycarboxylic acid anhydride is preferably conducted until the acid value of the resin solid fraction reaches a value within a range from 30 to 140 (mgKOH/g), and even more preferably a value from 50 to 120 (mgKOH/g), as such compositions exhibit superior developing properties.

Furthermore, the reactions of the above steps 1 through 4 can be conducted without solvent, in the presence of an organic solvent, and/or in the presence of a reactive diluent. As the quantity of organic solvent and/or reactive diluent is increased relative to either the resin component containing the aforementioned (X) and one or more unreacted resin components selected from the group consisting of the aforementioned (A2), (A1) and (B), or the resin component containing the aforementioned (X) and one or more unreacted resin components selected from the group consisting of the aforementioned (A2'), (A1') and (B'), the reaction rates of the steps 1 through 4 tend to slow. As a result, the proportion of the resin component within the synthesis system is preferably at least 50% by weight, and is even more preferably 70% by weight or greater.

Various materials can be used as the solvent or reactive diluent described above, and specific examples of suitable organic solvents include ketones such as methyl ethyl ketone and cyclohexanone; aromatic hydrocarbons such as toluene and xylene; cellosolves such as cellosolve and butyl cellosolve; carbitols such as carbitol and butyl carbitol; and ether-based solvents or acetate esters such as ethyl acetate, butyl acetate, cellosolve acetate, butyl cellosolve acetate, carbitol acetate, ethyl carbitol acetate, and butyl carbitol acetate. Furthermore, examples of suitable reactive diluents include the various acrylate or methacrylate monomers or oligomers, and vinyl monomers.

The molecular weight of the branched-polyether resin (X) obtained via the above step 1 and step 2 is affected by factors such as the equivalence ratio between the epoxy groups within the aromatic difunctional epoxy resin (b) and the carboxyl groups within the acrylic acid (a) and methacrylic acid (a') [namely, (epoxy group equivalent weight)/(carboxyl group equivalent weight)], the type of catalyst used, the quantity of the catalyst, the reaction temperature, and the reaction time. The reaction temperature in the step 2 is typically at least 100° C. in order to ensure a satisfactory reaction rate, and is preferably no higher than 170° C. in order to prevent rapid polymerization and ensure more favorable reaction control, and is most preferably within a range from 100 to 150° C.

Furthermore, the reaction times for the step 1, the step 1', the step 2 and the step 2' are affected by the temperature. For a temperature within the range described above, the reaction times for the step 1 and step 1' are typically each within a range from 0.5 to 10 hours, and preferably from 1 to 5 hours. The reaction times for the step 2 and step 2' are typically each within a range from 1 to 20 hours, and preferably from 2 to 15 hours.

In order to alter the molecular weight of the reaction mixture (I) used in the production method of the present invention, or the molecular weight of the branched-polyether resin (X) contained within the mixture, a variety of factors can be altered, including the molar ratio of the monoacrylate (A1) of an aromatic difunctional epoxy resin relative to the diacrylate (A2) of an aromatic difunctional epoxy resin [the degree of excess of epoxy groups within the aromatic difunctional epoxy resin (b) relative to carboxyl groups within the acrylic acid (a) in the step 1], the quantity used of the phosphorus-based catalyst (C), the reaction temperature, and the reaction time. For example, a branched-polyether resin composition of higher molecular weight can be obtained by reducing the molar ratio of the monoacrylate (A1) of an aromatic difunctional epoxy resin relative to the diacrylate (A2) of an aromatic difunctional epoxy resin (A1/A2) (for example, by setting this molar ratio within a range from 0 to 1) [namely, by reducing the excess of the molar ratio (b/a) of epoxy groups within the aromatic difunctional epoxy resin (b) relative to carboxyl groups within the acrylic acid (a) in the step 1 (for example, by setting b/a within a range from 1.25 to 3)], by increasing the quantity used of the phosphorus-based catalyst (C), by increasing the reaction temperature, by lengthening the reaction time, or by increasing the resin component concentration within the reaction system.

Furthermore, in order to adjust the quantity of acryloyl groups and epoxy groups introduced into the branched-polyether resin (X) in the aforementioned reaction mixture (I), factors such as the degree of excess of epoxy groups relative to the carboxyl groups of the acrylic acid within the reaction system, and the size of the epoxy equivalent weights of the diacrylate (A2) of an aromatic difunctional epoxy resin and the monoacrylate (A1) of an aromatic difunctional epoxy resin may be suitably altered. For example, by using a diacrylate and monoacrylate of an aromatic difunctional epoxy resin with a small epoxy equivalent weight as the diacrylate (A2) of an aromatic difunctional epoxy resin and the monoacrylate (A1) of an aromatic difunctional epoxy resin respectively, a branched-polyether resin composition with a higher acryloyl group and epoxy group content can be obtained. Furthermore, the acryloyl group and epoxy group content within the polyether resin can be varied by altering the degree of excess of epoxy groups relative to carboxyl groups within the reaction system.

In the production method of the present invention, the reaction mixture (I) and the branched-polyether resin (X) contained within the mixture can be synthesized with a molecular weight that satisfies the performance properties required for various application surfaces, but in order to ensure suitability to a variety of applications, the hydroxyl groups and acryloyl groups within the diacrylate (A2) of an aromatic difunctional epoxy resin and the monoacrylate (A1) of an aromatic difunctional epoxy resin are preferably reacted such that the average molecular weight of the resin component within the reaction mixture (I) [this resin component refers to the composition containing the branched-polyether resin (X), and at least one unreacted resin component selected from the group consisting of the diacrylate (A2) of an aromatic difunctional epoxy resin, the monoacrylate (A1) of an aromatic difunctional epoxy resin, and the aromatic difunctional epoxy resin (B), this definition also applies below], reported as a polystyrene equivalent number average molecular weight (Mn), falls within a range from 800 to 10,000, and conducting the reaction so that the molecular weight Mn falls within a range from 800 to 5,000 is even more desirable. Furthermore, the hydroxyl groups and acryloyl groups within the diacrylate (A2) of an aromatic difunctional epoxy resin and the monoacrylate (A1) of an aromatic difunctional epoxy resin are preferably reacted such that the average molecular weight of the resin component, reported as a polystyrene equivalent weight average molecular weight (Mw), falls within a range from 1,000 to 50,000, and conducting the reaction so that the molecular weight Mw falls within a range from 2,000 to 30,000 is even more desirable.

Furthermore, the hydroxyl groups and acryloyl groups within the diacrylate (A2) of an aromatic difunctional epoxy resin and the monoacrylate (A1) of an aromatic difunctional epoxy resin are preferably reacted such that the molecular weight of the branched-polyether resin (X), reported as a polystyrene equivalent number average molecular weight (Mn), falls within a range from 1,500 to 10,000, and conducting the reaction so that the molecular weight Mn falls within a range from 1,500 to 8,000 is even more desirable. Furthermore, the hydroxyl groups and acryloyl groups within the diacrylate (A2) of an aromatic difunctional epoxy resin and the monoacrylate (A1) of an aromatic difunctional epoxy resin are preferably reacted such that the average molecular weight of the resin component, reported as a polystyrene equivalent weight average molecular weight (Mw), falls within a range from 3,000 to 100,000, and conducting the reaction so that the molecular weight Mw falls within a range from 3,000 to 50,000 is even more desirable.

In the production method of the present invention, in order to obtain a branched-polyether resin composition (II) with excellent curability and superior mechanical properties for the resulting cured product, factors such as the respective proportions of the raw materials, the quantity of the catalyst, and the reaction conditions are preferably adjusted so that the epoxy equivalent weight of the resin component within the reaction mixture (I) falls within a range from 250 to 10,000 g/equivalent, and adjustment of the above factors so that the epoxy equivalent weight falls within a range from 400 to 5,000 g/equivalent is even more desirable. Furthermore, in order to obtain a branched-polyether resin composition (II) with excellent curability and superior mechanical properties for the resulting cured product, factors such as the respective proportions of the raw materials, the quantity of the catalyst, and the reaction conditions are preferably adjusted so that the epoxy equivalent weight of the branched-polyether resin (X) falls within a range from 500 to 10,000 g/equivalent, and adjustment of the above factors so that the epoxy equivalent weight falls within a range from 800 to 8,000 g/equivalent is even more desirable.

Furthermore, the average molecular weights of the branched-polyether resin composition (II) and the acid pendant branched-polyether resin composition (III) obtained using the production method of the present invention, reported as polystyrene equivalent number average molecular weights (Mn), are preferably within a range from 1,000 to 12,000, and are even more preferably from 1,000 to 7,000. Moreover, the average molecular weights of the branched-polyether resin composition (II) and the acid pendant branched-polyether resin composition (III) obtained using the production method of the present invention, reported as polystyrene equivalent weight average molecular weights (Mw), are preferably within a range from 2,000 to 60,000, and are even more preferably from 3,000 to 40,000.

Furthermore, the molecular weights of the branched-polyether resin (Y) and the acid pendant branched-polyether resin (Z), reported as polystyrene equivalent number average molecular weights (Mn), are preferably within a range from 2,000 to 15,000, and are even more preferably from 2,500 to 10,000. Moreover, the molecular weights of the branched-polyether resin (Y) and the acid pendant branched-polyether resin (Z), reported as polystyrene equivalent weight average molecular weights (Mw), are preferably within a range from 4,000 to 100,000, and are even more preferably from 5,000 to 70,000.

In order to ensure more favorable stability of the branched-polyether resin composition (II), the epoxy groups within the branched-polyether resin composition (II) and the epoxy groups within the branched-polyether resin (Y) are preferably completely consumed by the reaction with the unsaturated monocarboxylic acid, although a portion of unreacted epoxy groups may also remain. If residual epoxy groups exist, then in terms of ensuring favorable stability of the branched-polyether resin composition, the epoxy equivalent weight of the branched-polyether resin composition (II) is preferably at least 10,000 g/equivalent, and is even more preferably 15,000 g/equivalent or higher. Furthermore, in terms of ensuring favorable stability of the branched-polyether resin composition, the epoxy equivalent weight of the branched-polyether resin (Y) within the branched-polyether resin composition (II) is also preferably at least 10,000 g/equivalent, and is even more preferably 15,000 g/equivalent or higher.

In addition, for the reaction mixture (I) used in the present invention, the acryloyl group content per 1 g of the resin component is preferably within a range from 0.2 to 4.0 mmol, and is even more preferably from 0.3 to 3.5 mmol. For the reaction mixture (I) used in the present invention, the hydroxyl group content per 1 g of the resin component is preferably within a range from 0.2 to 4.0 mmol, and is even more preferably from 0.3 to 3.5 mmol. Furthermore, for the branched-polyether resin (X), the acryloyl group content per 1 g of the resin component is preferably within a range from 0.2 to 3.5 mmol, and is even more preferably from 0.3 to 3.3 mmol. Moreover, for the branched-polyether resin (X), the hydroxyl group content per 1 g of the resin component is preferably within a range from 0.2 to 3.5 mmol, and is even more preferably from 0.3 to 3.3 mmol.

In the branched-polyether resin composition (II) obtained in the present invention, in order to ensure superior curability and obtain a cured product with a favorable balance between heat resistance and flexibility, the unsaturated group content per 1 g of the resin component is preferably within a range from 1.0 to 4.2 mmol, and is even more preferably from 1.5 to 4.0 mmol. Moreover, in the branched-polyether resin composition (II) obtained in the present invention, in order to ensure superior curability and obtain a cured product with a favorable balance between heat resistance and flexibility, the hydroxyl group content per 1 g of the resin component is preferably within a range from 1.0 to 4.2 mmol, and is even more preferably from 1.5 to 4.0 mmol.

Furthermore, in the case of the branched-polyether resin (Y), in order to ensure superior curability and obtain a cured product with a favorable balance between heat resistance and flexibility, the unsaturated group content per 1 g of the resin is preferably within a range from 0.5 to 3.5 mmol, and is even more preferably from 1.0 to 3.3 mmol. Moreover, in the branched-polyether resin (Y), in order to ensure superior curability and obtain a cured product with a favorable balance between heat resistance and flexibility, the hydroxyl group content per 1 g of the resin is preferably within a range from 0.5 to 3.5 mmol, and is even more preferably from 1.0 to 3.3 mmol.

In the acid pendant branched-polyether resin composition (III) obtained in the present invention, in order to ensure superior curability and obtain a cured product with a favorable balance between heat resistance and flexibility, the unsaturated group content per 1 g of the resin component is preferably within a range from 0.8 to 3.8 mmol, and is even more preferably from 1.0 to 3.5 mmol. Moreover, in the acid pendant branched-polyether resin composition (III) obtained in the present invention, in order to ensure superior curability and obtain a cured product with a favorable balance between heat resistance and flexibility, the hydroxyl group content per 1 g of the resin component is preferably no greater than 3.5 mmol (and may be 0), and is even more preferably no greater than 3.0 mmol (and may be 0).

Furthermore, in the case of the acid pendant branched-polyether resin (Z), in order to ensure superior curability and obtain a cured product with a favorable balance between heat resistance and flexibility, the unsaturated group content per 1 g of the resin is preferably within a range from 0.4 to 3.2 mmol, and is even more preferably from 0.8 to 2.8 mmol. Moreover, in the acid pendant branched-polyether resin (Z), in order to ensure superior curability and obtain a cured product with a favorable balance between heat resistance and flexibility, the hydroxyl group content per 1 g of the resin is preferably no greater than 2.8 mmol (and may be 0), and is even more preferably no greater than 2.3 mmol (and may be 0).

In addition, in order to ensure superior developing properties, the acid pendant branched-polyether resin composition (III) preferably has a resin solid fraction acid value within a range from 30 to 140 (mgKOH/g), and values from 50 to 120 (mgKOH/g) are even more desirable. Furthermore, in order to ensure superior developing properties, the acid pendant branched-polyether resin (Z) preferably has a resin solid fraction acid value within a range from 50 to 120 (mgKOH/g), and values from 60 to 110 (mgKOH/g) are even more desirable.

The reaction mixture (I) used in the present invention includes the branched-polyether resin (X) as an essential component, and preferably contains from 20 to 90% by weight of the branched-polyether resin (X) within the combined 100% by weight of the total resin component within the composition. Furthermore, in addition to the branched-polyether resin (X), the reaction mixture (I) also includes one or more unreacted resin components selected from the group consisting of the diacrylate (A2) of an aromatic difunctional epoxy resin, the monoacrylate (A1) of an aromatic difunctional epoxy resin, and the aromatic difunctional epoxy resin (B). These one or more unreacted resin components preferably total from 10 to 80% by weight of the combined 100% by weight of the total resin component within the reaction mixture (I), and more specifically, the quantity of the diacrylate (A2) of an aromatic difunctional epoxy resin is preferably within a range from 5 to 50% by weight, the quantity of the monoacrylate (A1) of an aromatic difunctional epoxy resin is preferably within a range from 5 to 30% by weight [provided that the combined total of the diacrylate (A2) of an aromatic difunctional epoxy resin and the monoacrylate (A1) of an aromatic difunctional epoxy resin is within a range from 10 to 80% by weight], and the quantity of the aromatic difunctional epoxy resin (B) is preferably from 0 to 30% by weight. In those cases where the reaction mixture (I) includes the aromatic difunctional epoxy resin (B) as an unreacted resin component, the quantity of the aromatic difunctional epoxy resin (B) is even more preferably within a range from 5 to 30% by weight.

The branched-polyether resin composition (II) obtained in the present invention includes the branched-polyether resin (Y) as an essential component, and in terms of ensuring excellent tack-free drying properties during film formation and superior flexibility of the cured film, preferably contains from 30 to 95% by weight, and even more preferably from 50 to 90% by weight, of the branched-polyether resin (Y) within the combined 100% by weight of the total resin component within the composition. In this branched-polyether resin composition (II), the main resin component other than the branched-polyether resin (Y) is the di(unsaturated monocarboxylate) ester of an aromatic difunctional epoxy resin obtained by the reaction between the epoxy groups within the one or more resin components selected from the group consisting of the diacrylate (A2) of an aromatic difunctional epoxy resin, the monoacrylate (A1) of an aromatic difunctional epoxy resin and the aromatic difunctional epoxy resin (B), and the carboxyl groups within the unsaturated monocarboxylic acid. The quantity of this di(unsaturated monocarboxylate) ester of an aromatic difunctional epoxy resin is preferably within a from 5 to 70% by weight of the combined 100% by weight of the total resin component within the branched-polyether resin composition (II), and quantities from 10 to 50% by weight are even more desirable.

The acid pendant branched-polyether resin composition (III) obtained in the present invention includes the acid pendant branched-polyether resin (Z) as an essential component, which is obtained by forming carboxylic acid pendants via a reaction between the hydroxyl groups within the branched-polyether resin (Y) and the acid anhydride groups within the polycarboxylic acid anhydride, and in terms of ensuring excellent tack-free drying properties during film formation and superior flexibility of the cured film, preferably contains from 30 to 95% by weight, and even more preferably from 50 to 90% by weight, of the acid pendant branched-polyether resin (Z) within the combined 100% by weight of the total resin component within the composition. In this acid pendant branched-polyether resin composition (III), the main resin component other than the acid pendant branched-polyether resin (Z) is the acid pendant aromatic difunctional epoxy resin di(unsaturated monocarboxylate) ester obtained by generating carboxylic acid pendants by reacting the acid anhydride groups within the polycarboxylic acid anhydride with the hydroxyl groups within the aforementioned di(unsaturated monocarboxylate) ester of an aromatic difunctional epoxy resin. The quantity of this acid pendant aromatic difunctional epoxy resin di(unsaturated monocarboxylate) ester is preferably within a range from 5 to 70% by weight of the combined 100% by weight of the total resin component within the acid pendant branched-polyether resin composition (III), and quantities from 10 to 50% by weight are even more desirable.

Examples of the acid pendant branched-polyether resin (Z) within the acid pendant branched-polyether resin composition (III) obtained via the steps 1 through 4 described above include acid pendant branched-polyether resins (Z1) with a weight average molecular weight of 4,000 to 100,000, containing an unsaturated group such as an acryloyl group, a carboxyl group, a structure represented by a general formula (3) shown below, and a structure represented by a general formula (4) shown below.

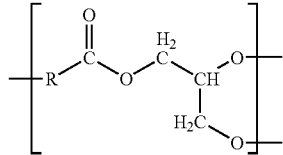

(3)

[In the general formula (3), R represents a linkage group represented by a structural formula (1) or (2) shown below.]

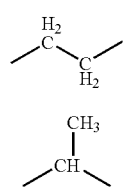

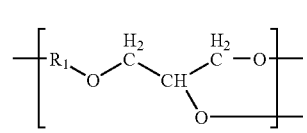

(4)

[In the general formula (4), $R_1$ represents an aromatic linkage group with a structure in which two glycidyl ether groups have been removed from a bivalent aromatic difunctional epoxy resin (B).]

Of the above acid pendant branched-polyether resins (Z1), in order to ensure superior levels of tack-free drying properties during film formation and curability, and excellent flexibility of the cured film, resins in which the number average molecular weight is within a range from 2,000 to 15,000, the weight average molecular weight is within a range from 4,000 to 100,000, and the acid value is from 50 to 120 (KOH-mg/g) are preferred, and resins in which the number average molecular weight is from 2,500 to 10,000, the weight average molecular weight is from 5,000 to 70,000, and the acid value is from 60 to 110 (KOH-mg/g) are even more desirable.

Furthermore, of the above acid pendant branched-polyether resins (Z1), in order to ensure superior curability, resins in which the unsaturated group quantity per 1 g of resin is within a range from 0.4 to 3.2 mmol, and the hydroxyl group quantity per 1 g of resin is no higher than 2.8 mmol (and may be 0) are preferred, and resins in which the unsaturated group quantity per 1 g of resin is from 0.8 to 2.8 mmol, and the hydroxyl group quantity per 1 g of resin is no higher than 2.3 mmol (and may be 0) are even more desirable.

Moreover, the aforementioned acid pendant branched-polyether resin (Z1) is preferably an acid pendant branched-polyether resin (Z2) represented by a general formula (5) shown below.

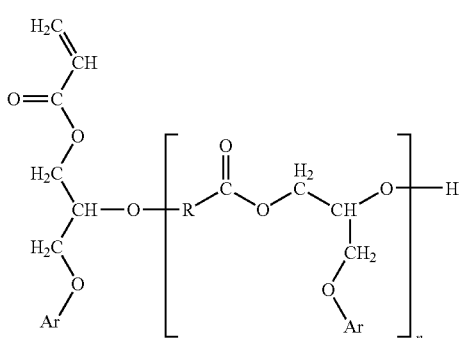

(5)

[In the general formula (5), n represents a number of repeating units from 2 to 100, and each R group within these n repeating units represents, independently, a linkage group represented by the aforementioned structural formula (1) or (2). Furthermore, each group Ar, which exists both within the n repeating units and outside the repeating units, represents, independently, a structure represented by a general formula (6) or (7) shown below.]

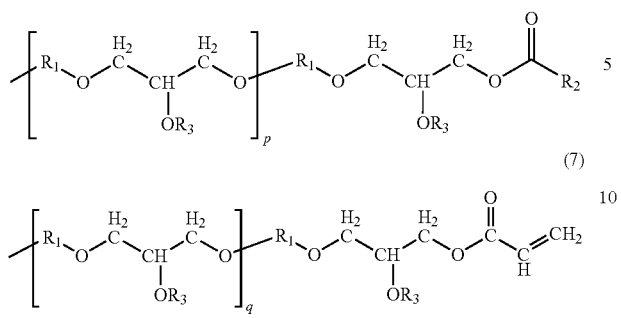 (6)

(7)

[In the general formulas (6) and (7), $R_1$ represents an aromatic linkage group with a structure in which two glycidyl ether groups have been removed from an aromatic difunctional epoxy resin (B), and p and q each represent, independently, a number of repeating units within a range from 0 to 20. $R_2$ represents a residue structure in which a carboxyl group has been removed from an unsaturated monocarboxylic acid, and when the unsaturated monocarboxylic acid is acrylic acid, the general formulas (6) and (7) have the same structure. Furthermore, each $R_3$ represents, independently, a hydrogen atom, a structure represented by a general formula (8) shown below, or a structure obtained by a half esterification between a dicarboxylic acid anhydride and a hydroxyl group, such as the structure represented by a general formula (9) shown below.]

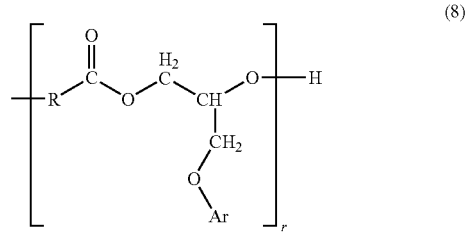 (8)

[In the general formula (8), r represents a number of repeating units within a range from 1 to 50, and each R group within these r repeating units represents, independently, a linkage group represented by an aforementioned structural formula (1) or (2). Furthermore, each Ar group within the r repeating units represents, independently, a structure represented by the general formula (6) or (7) shown above, although the $R_3$ group in the general formula (6) or (7) may also be a structure represented by the above general formula (8), thereby creating a linkage and forming another branch.]

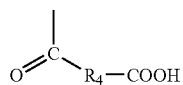 (9)

[In the general formula (9), $R_4$ represents a saturated or unsaturated hydrocarbon group of 2 to 12 carbon atoms that may include a carboxyl group.]

The $R_1$ group in the above general formulas (4), (6) and (7) [namely, the aromatic linkage group with a structure in which two glycidyl ether groups have been removed from an aromatic difunctional epoxy resin (B)] is preferably an aromatic linkage group such as a naphthylene group or a structure represented by a general formula (10) shown below.

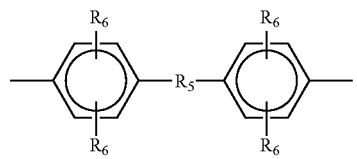 (10)

[In the general formula (10), $R_5$ represents a single bond or a bivalent linkage group, and $R_6$ represents a hydrogen atom or an alkyl group of 1 to 5 carbon atoms.]

Examples of the branched-polyether resin (Y) within the branched-polyether resin composition (II) that is used during the production of the aforementioned acid pendant branched-polyether resin composition (III) include branched-polyether resins (Y1) with a weight average molecular weight of 4,000 to 100,000, containing an unsaturated group such as an acryloyl group, a hydroxyl group, a structure represented by the general formula (3) shown above, and a structure represented by the general formula (4) shown above.

Of the above branched-polyether resins (Y1), in order to ensure superior levels of tack-free drying properties during film formation, and excellent flexibility of the cured film, resins in which the number average molecular weight is within a range from 2,000 to 15,000, the weight average molecular weight is within a range from 4,000 to 100,000, and the epoxy equivalent weight is at least 10,000 g/equivalent are preferred, and resins in which the number average molecular weight is from 2,500 to 10,000, the weight average molecular weight is from 5,000 to 70,000, and the epoxy equivalent weight is at least 15,000 g/equivalent are even more desirable.

Furthermore, of the above branched-polyether resins (Y1), in order to ensure superior curability and enable the formation of a cured product with a favorable balance between heat resistance and flexibility, resins in which the unsaturated group quantity per 1 g of resin is within a range from 0.5 to 3.5 mmol, and the hydroxyl group quantity per 1 g of resin is within a range from 0.5 to 3.5 mmol are preferred, and resins in which the unsaturated group quantity per 1 g of resin is from 1.0 to 3.3 mmol, and the hydroxyl group quantity per 1 g of resin is from 1.0 to 3.3 mmol are even more desirable.

Moreover, the aforementioned branched-polyether resin (Y1) is preferably a branched-polyether resin (Y2) represented by a general formula (11) shown below.

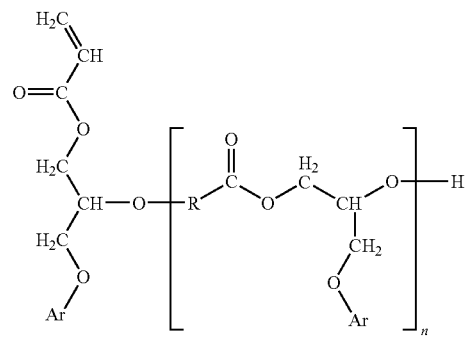 (11)

[In the general formula (11), n represents a number of repeating units from 2 to 100, and each R group within these n repeating units represents, independently, a linkage group represented by the aforementioned structural formula (1) or (2). Furthermore, each group Ar, which exists both within the n repeating units and outside the repeating units, represents, independently, a structure represented by a general formula (12) or (13) shown below.]

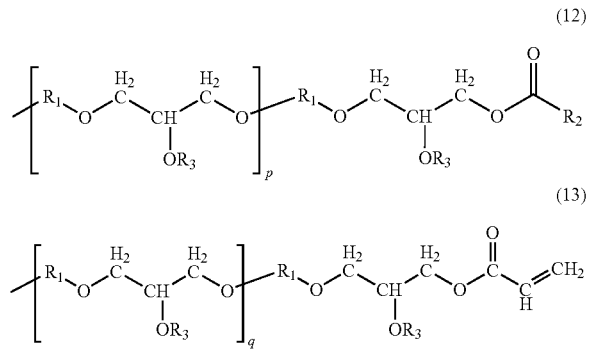

[In the general formulas (12) and (13), $R_1$ represents an aromatic linkage group with a structure in which two glycidyl ether groups have been removed from an aromatic difunctional epoxy resin (B), and p and q each represent, independently, a number of repeating units within a range from 0 to 20. $R_2$ represents a residue structure in which a carboxyl group has been removed from an unsaturated monocarboxylic acid, and when the unsaturated monocarboxylic acid is acrylic acid, the general formulas (12) and (13) have the same structure. Furthermore, $R_3$ represents a hydrogen atom, or a structure represented by a general formula (14) shown below.]

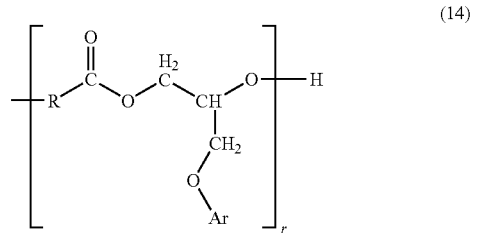

[In the general formula (14), r represents a number of repeating units within a range from 1 to 50, and each R group within these r repeating units represents, independently, a linkage group represented by an aforementioned structural formula (1) or (2). Furthermore, each Ar group within the r repeating units represents, independently, a structure represented by the general formula (12) or (13) shown above, although the $R_3$ group in the general formula (12) or (13) may also be a structure represented by the above general formula (14), thereby creating a linkage and forming another branch.]

In the case of the aforementioned branched-polyether resin (Y2), the $R_1$ group in the above general formulas (4), (12) and (13) [namely, the aromatic linkage group with a structure in which two glycidyl ether groups have been removed from an aromatic difunctional epoxy resin (B)] is preferably an aromatic linkage group such as a naphthylene group or a structure represented by the general formula (10) shown above.

Furthermore, examples of the branched-polyether resin (X) within the resin composition (I) that is used during the production of the aforementioned branched-polyether resin composition (II) include branched-polyether resins (X1) with a weight average molecular weight of 3,000 to 1,000,000, containing a hydroxyl group, an acryloyl group, an epoxy group, a structure represented by the general formula (3) shown above, and a structure represented by the general formula (4) shown above.

Of the above branched-polyether resins (X1), in order to ensure superior tack-free drying properties during film formation and excellent flexibility of the cured film, resins in which the number average molecular weight is within a range from 1,500 to 10,000, the weight average molecular weight is within a range from 3,000 to 100,000, and the epoxy equivalent weight is within a range from 500 to 10,000 g/equivalent are preferred, and resins in which the number average molecular weight is from 1,500 to 8,000, the weight average molecular weight is from 3,000 to 50,000, and the epoxy equivalent weight is within a range from 800 to 8,000 g/equivalent are even more desirable.

Furthermore, of the above branched-polyether resins (X1), in order to ensure superior tack-free drying properties during film formation and excellent flexibility of the cured film, resins in which the unsaturated group quantity per 1 g of resin is within a range from 0.2 to 3.5 mmol, and the hydroxyl group quantity per 1 g of resin is within a range from 0.2 to 3.5 mmol are preferred, and resins in which the unsaturated group quantity per 1 g of resin is from 0.3 to 3.3 mmol, and the hydroxyl group quantity per 1 g of resin is from 0.3 to 3.3 mmol are even more desirable.

Moreover, the aforementioned branched-polyether resin (X1) is preferably a branched-polyether resin (X2) represented by a general formula (15) shown below.

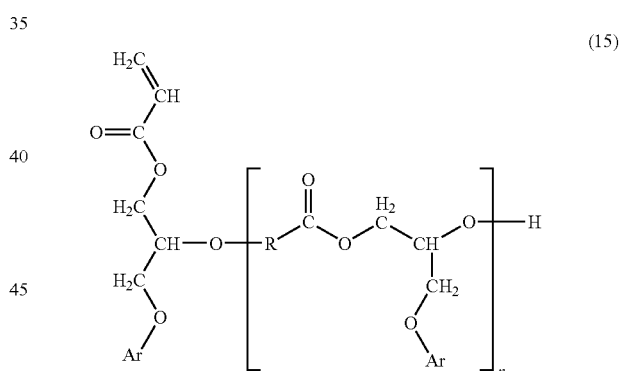

[In the general formula (15), n represents a number of repeating units from 2 to 100, and each R group within these n repeating units represents, independently, a linkage group represented by the aforementioned structural formula (1) or (2). Furthermore, each group Ar, which exists both within the n repeating units and outside the repeating units, represents, independently, a structure represented by a general formula (16) or (17) shown below.

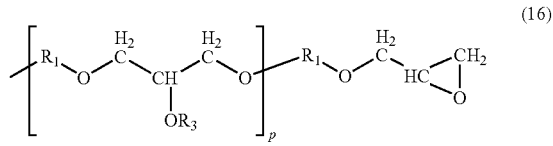

-continued (17)

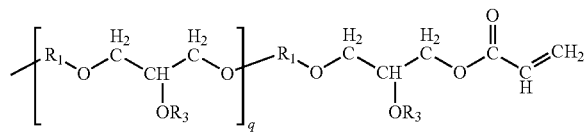

[In the general formulas (16) and (17), $R_1$ represents an aromatic linkage group with a structure in which two glycidyl ether groups have been removed from an aromatic difunctional epoxy resin (B), and p and q each represent, independently, a number of repeating units within a range from 0 to 20. Furthermore, $R_3$ represents a hydrogen atom, or a structure represented by a general formula (18) shown below.]

(18)

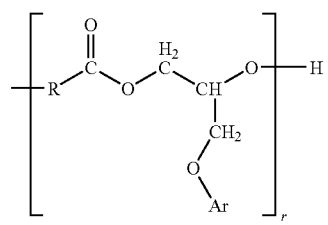

[In the general formula (18), r represents a number of repeating units within a range from 1 to 50, and each R group within these r repeating units represents, independently, a linkage group represented by an aforementioned structural formula (1) or (2). Furthermore, each Ar group within the r repeating units represents, independently, a structure represented by the general formula (16) or (17) shown above, although the $R_3$ group in the general formula (16) or (17) may also be a structure represented by the above general formula (18), thereby creating a linkage and forming another branch.]

In the case of the aforementioned branched-polyether resin (X2), the $R_1$ group in the above general formulas (4), (16) and (17) [namely, the aromatic linkage group with a structure in which two glycidyl ether groups have been removed from an aromatic difunctional epoxy resin (B)] is preferably an aromatic linkage group such as a naphthylene group or a structure represented by the general formula (10) shown above.

If required, the branched-polyether resin composition (II) obtained using the production method of the present invention may also include added reaction products or the like of an epoxy compound other than the aforementioned aromatic difunctional epoxy resin (B) and an unsaturated monocarboxylic acid, but in such cases, compositions in which the proportion of the branched-polyether resin (Y) within the combined 100% by weight of the total resin component within the composition is within a range from 20 to 90% by weight exhibit superior tack-free drying properties during film formation and excellent flexibility of the cured film, and are consequently preferred. Other epoxy compounds (b) may also be added to the branched-polyether resin composition (II).

Furthermore, if required, the acid pendant branched-polyether resin composition (III) obtained using the production method of the present invention may also include the aforementioned other epoxy compounds or reaction products of a different epoxy compound and an unsaturated monocarboxylic acid, but in such cases, compositions in which the proportion of the acid pendant branched-polyether resin (Z) within the combined 100% by weight of the total resin component within the composition is within a range from 20 to 90% by weight exhibit superior tack-free drying properties during film formation and excellent flexibility of the cured film, and are consequently preferred.

There are no particular restrictions on the aforementioned epoxy compound other than the aromatic difunctional epoxy resin (B), and any compound from a monoepoxy compound through to a polyfunctional epoxy resin can be used. Specific examples of suitable epoxy compounds include monoepoxy compounds such as phenyl glycidyl ether and alkylphenyl glycidyl ethers; biphenol epoxy resins; bisphenol epoxy resins such as bisphenol A, bisphenol F and bisphenol S epoxy resins; various novolak resins such as novolak epoxy resins that use any of the various bisphenols, cresol novolak epoxy resins, phenol novolak epoxy resins and xylenol novolak epoxy resins; dicyclopentadiene-modified aromatic epoxy resins; dihydroxynaphthalene epoxy resins obtained by epoxidation of a dihydroxynaphthalene, and epoxy resins obtained by epoxidation of a novolak form of a dihydroxynaphthalene; glycidyl ester resins of polyvalent carboxylic acids; epoxy resins derived from xylenol, phenolaralkyl epoxy resins, naphthalenearalkyl epoxy resins, and other xyloc epoxy resins; hydrogenated products of the above aromatic epoxy compounds; and aliphatic, alicyclic, and ether-backbone epoxy resins.

Furthermore, examples of the unsaturated monocarboxylic acid used in the reaction with these other epoxy compounds include acrylic acid, methacrylic acid, crotonic acid, cinnamic acid, monomethyl maleate, monoethyl maleate, monopropyl maleate, monobutyl maleate, mono(2-ethylhexyl) maleate, and sorbic acid.

The branched-polyether resin composition (II) and the acid pendant branched-polyether resin composition (III) obtained in the production method of the present invention can both be used as heat-curable and/or photocurable resins, either without further modification, or following urethanization or some other chemical modification.

In those cases where the branched-polyether resin composition (II) and the acid pendant branched-polyether resin composition (III) are used as a heat-curable resin and/or a photocurable resin, an additional curing agent may also be added to the composition.

There are no particular restrictions on the curing agent, and for example, in those cases where the branched-polyether resin composition (II) and/or the acid pendant branched-polyether resin composition (III) are subjected to photocuring, a photoinitiator and/or a photosensitizer may be added. Furthermore, when the compositions are subjected to heat curing, a radical generator such as a peroxide can be added. Moreover, an epoxy resin may be added as a heat-curable component, and an epoxy resin curing agent then used in combination in order to effect heat curing. Particularly in those cases where the acid pendant branched-polyether resin composition (III) is used as a photopatterning material, by using an epoxy resin and/or a combination of an epoxy resin and an epoxy resin curing agent, conducting photocuring, subsequently conducting pattern formation by performing a developing treatment with a dilute aqueous alkali solution, and then conducting heat curing, a cured product with excellent heat resistance and durability can be obtained. An isocyanate group-containing curing agent may also be added to enable urethane curing.

Examples of the above epoxy resin curing agent include any of the various compounds used as epoxy resin curing agents, and specific examples include aliphatic polyamines such as triethylenetetramine; alicyclic polyamines such as bis(3-methyl-4-aminocyclohexyl)methane; aromatic polyamines such as diaminodiphenylmethane and diaminodiphenylsulfone; novolak phenol resins; polybasic acid anhydrides such as methylhexahydrophthalic anhydride and benzophenone tetracarboxylic dianhydride; polyamidoamine resins and modified products thereof; and latent curing agents such as imidazole, dicyandiamide, boron trifluoride-amine complexes, and guanidine derivatives. Of these curing agents, diaminodiphenylmethane, diaminodiphenylsulfone, novolak phenol resins, dicyandiamide, and polybasic acid anhydrides are preferred. These curing agents may be used either alone, or in combinations of two or more different materials.

The quantity used of the above epoxy resin curing agent, in the case of a curing agent containing active hydrogen atoms on the amino groups, imino groups or phenolic hydroxyl groups within the curing agent, is preferably sufficient to provide from 0.3 to 1.2 equivalents of active hydrogen atoms for each 1 equivalent of epoxy groups within the epoxy resin added to the branched-polyether resin composition (II) or acid pendant branched-polyether resin composition (III). Furthermore, in the case of an acid anhydride, the quantity of the curing agent is preferably sufficient to provide from 0.3 to 1.2 equivalents of acid anhydride groups for each 1 equivalent of epoxy groups within the epoxy resin added to the branched-polyether resin composition (II) or acid pendant branched-polyether resin composition (III).

Furthermore, when an epoxy resin curing agent is used, a suitable quantity of a curing accelerator can also be used. There are no particular restrictions on the types of curing accelerator that can be used, and any of the compounds typically used as curing accelerators for epoxy resins are suitable, including tertiary amines such as dimethylbenzylamine, imidazole-based compounds such as 2-methylimidazole, and organophosphorus compounds such as triphenylphosphine.

Suitable examples of the aforementioned photoinitiator include acetophenones, benzophenone derivatives, Michler's ketone, benzine, benzil derivatives, benzoin derivatives, benzoin methyl ethers, α-acyloxime ester, thioxanthones, anthraquinones, and various derivatives of the above compounds.

Specific examples of the above photoinitiators include 4-dimethylaminobenzoic acid, 4-dimethylaminobenzoate esters, alkoxyacetophenones, benzil dimethyl ketal, benzophenone, alkyl benzoylbenzoates, bis(4-dialkylaminophenyl) ketones, benzil, benzoin, benzoin benzoate, benzoin alkyl ethers, 2-hydroxy-2-methylpropiophenone, 1-hydroxycyclohexyl phenyl ketone, thioxanthone, 2,4,6-trimethylbenzoyldiphenoylphosphine oxide, bis(2,6-dimethoxybenzoyl)-2,4,4-trimethyl-pentylphosphine oxide, bis(2,4,6-trimethylbenzoyl)-phenylphosphine oxide, 2-methyl-1-[4-(methylthio)phenyl]-2-morpholinopropan-1-one, 2-benzyl-2-dimethylamino-1-(4-morpholinophenyl)-butanone-1, and metallocene compounds.

In addition, any of the various photosensitizers may also be used in combination with the above photoinitiators, and suitable examples of these photosensitizers include amines, urea compounds, sulfur-containing compounds, phosphorus-containing compounds, chlorine-containing compounds, and nitrites or other nitrogen-containing compounds.

The quantity used of the photoinitiator is typically within a range from 0.5 to 25 parts by weight, and preferably from 1 to 15 parts by weight, per 100 parts by weight of the resin fraction within the composition.

If required, various additives may also be added to the branched-polyether resin composition obtained using the production method of the present invention, and examples of these additives include fillers, colorants, flame retardants, release agents, and thermoplastic resin silane coupling agents.

Representative examples of the above fillers include silica powder, zirconium silicate, alumina, calcium carbonate, quartz powder, zirconium oxide, talc, clay, barium sulfate, asbestos powder, or milled glass. Furthermore, representative examples of suitable colorants include carbon black and the like, representative examples of suitable flame retardants include antimony trioxide and the like, representative examples of suitable release agents include carnauba wax and the like, and representative examples of suitable silane coupling agents include aminosilane or epoxysilane.

Furthermore, the branched-polyether resin composition obtained using the production method of the present invention can be used for various applications, including as an electrical insulating material such as a sealing material for electrical or electronic components, an insulating varnish, a laminate sheet or an insulating powdery coating; as an adhesive for printed wiring board laminate sheets and prepregs, a conductive adhesive, or structural materials such as honeycomb panels; for fiber-reinforced plastics or prepregs that employ reinforcing fibers such as glass fiber, carbon fiber or aramid fiber; and as a resist ink.

In those cases where the acid pendant branched-polyether resin composition (III) is used as a photopatterning material such as a resist ink, for example, the acid pendant branched-polyether resin composition (III) that functions as the photopatterning material is applied to a substrate with a dried film thickness of approximately 5 to 100 μm, the solvent is dried if necessary, and ultraviolet light is then irradiated onto the patterning material through a photomask. In those regions where the light passes through the photomask, the ultraviolet light causes a curing reaction, whereas in those regions where the photomask prevents the ultraviolet light from passing through, no curing reaction occurs. The coating that has been irradiated with ultraviolet light through a mask in this manner is then developed using a dilute aqueous alkali solution as the developing solution, enabling the formation of a desired pattern. Examples of suitable developing solutions that can be used include inorganic aqueous alkali solutions such as sodium carbonate, potassium carbonate, sodium hydroxide and potassium hydroxide, as well as organic aqueous alkali solutions such as tetramethylammonium hydroxide. Furthermore, the concentration of the developing solution is typically within a range from 0.2 to 5% by weight, and the developing solution may also contain a surfactant. The developing is conducted by immersion, agitated immersion, or coating methods such as spray coating in order to achieve the desired pattern formation.

EXAMPLES

Next is a more detailed description of the present invention using a series of examples and comparative examples. In the following description, unless stated otherwise the units "%" and "parts" refer to weight-referenced values. Furthermore, the units for the viscosity, acid value, and epoxy equivalence values shown in the following tables are Pa·s, mgKOH/g, and g/equivalent respectively.

Example 1

A flask fitted with a thermometer, a stirrer, and a reflux condenser was charged with 24.9 g of ethyl carbitol acetate, and following the dissolution of 188 g of a bisphenol A epoxy resin (epoxy equivalent weight: 188 g/equivalent; EPICLON 850, manufactured by Dainippon Ink and Chemicals, Incorporated) and the addition of 1 g of hydroquinone as a polymerization inhibitor, 36.1 g (0.5 mol) of acrylic acid was added. 0.446 g (0.2% of the resin component) of triphenylphosphine was added as a catalyst, and the temperature was then raised to 130° C. over 2 hours under constant stirring. The point where the temperature reached 130° C. was deemed 0 hours, and the reaction was subsequently continued at the same temperature for 10 hours, while sampling was conducted after 0, 2, 6, 8 and 10 hours respectively, thereby yielding a pale yellow, transparent, resin-like reaction mixture (I-1) containing a branched-polyether resin (X1). Each of the 5 samples was measured for viscosity [E-type viscometer, (25° C.)], acid value (of the solid fraction) and epoxy equivalent weight (of the solid fraction), and the results of a molecular weight distribution measurement using GPC were used to determine the number average molecular weight (Mn) and the weight average molecular weight (Mw). The results obtained are shown below in Table 1-1.

TABLE 1-1

| Time elapsed* (hours) | Viscosity (Pa · s) | Acid value (mgKOH/g) | Epoxy equivalent weight (g/equivalent) | Number average molecular weight (Mn) | Weight average molecular weight (Mw) |
|---|---|---|---|---|---|
| 0 | 11 | 2 | 510 | 511 | 680 |
| 2 | 84 | 0.1 | 531 | 755 | 1614 |
| 6 | 150 | 0.07 | 532 | 863 | 1975 |
| 8 | 153 | 0.07 | 532 | 870 | 2147 |
| 10 | 155 | 0.08 | 533 | 899 | 2272 |

*Time elapsed: The time from the point where 130° C. was reached until the sampling time On the basis of GPC, the thus obtained reaction mixture (I-1) was found to contain the components shown below in Table 1-2. Furthermore, the epoxy equivalent weight (of the solid fraction) of the branched-polyether resin (X1), calculated from the respective quantities of each component shown below in Table 1-2 and the epoxy equivalent weight (of the solid fraction) of the reaction mixture (I-1) after 10 hours had elapsed shown above in Table 1-1, was 1,148 g/equivalent. This epoxy equivalent weight (of the solid fraction) of the branched-polyether resin (X1) was calculated using the equation 100/[epoxy equivalent weight of the reaction mixture (I-1)]={(quantity of bisphenol A epoxy resin)/(epoxy equivalent weight thereof)+(quantity of epoxy group-containing bisphenol A epoxy monoacrylate)/(epoxy equivalent weight thereof)+(quantity of branched-polyether resin (X1)/(epoxy equivalent weight thereof)}, in other words, 100/533=[(19.3/188)+(15.5/448)+(57.8/epoxy equivalent weight of the branched-polyether resin (X1)].

TABLE 1-2

| Resin Component | Quantity (%) | | |
|---|---|---|---|
| Bisphenol A epoxy resin | | 19.3 | |
| Mono and diacrylate of bisphenol A epoxy resin | 22.9 | Monoacrylate Diacrylate | 15.5 7.4 |
| Branched-polyether resin (X1) | | 57.8 | |

Subsequently, to 224.1 g of the solid fraction of the above reaction mixture (I-1) were added 30.4 g (0.42 mol: equivalent to 1 mol for each 1 mol of residual epoxy groups) of acrylic acid and 38.7 g of ethyl carbitol acetate, and the resulting mixture was reacted at 130° C. for 5 hours, yielding a pale yellow, transparent, resin-like branched-polyether resin composition (II-1) containing a branched-polyether resin (Y1). The epoxy equivalent weight (of the solid fraction) of the branched-polyether resin composition (II-1) was 18,500 g/equivalent, and the acid value (of the solid fraction) was 0.2 (mgKOH/g). The results of a molecular weight distribution measurement using GPC were used to determine the composition of the branched-polyether resin composition (II-1), and the number average molecular weight (Mn) and weight average molecular weight (Mw) referenced against polystyrene standard samples. The results obtained are shown below in Table 1-3.

TABLE 1-3

| Resin Component | Quantity |
|---|---|
| Bisphenol A epoxy resin diacrylate | 41.5% |
| Branched-polyether resin (Y1) | 58.5% |
| Branched-polyether resin composition (II-1) | Number average molecular weight (Mn): 1,340 Weight average molecular weight (Mw): 3,350 |

Example 2

A flask fitted with a thermometer, a stirrer, and a reflux condenser was charged with 26.5 g of ethyl carbitol acetate, and following the dissolution of 188 g of a bisphenol A epoxy resin (epoxy equivalent weight: 188 g/equivalent; EPICLON 850, manufactured by Dainippon Ink and Chemicals, Incorporated) and the addition of 1 g of hydroquinone as a polymerization inhibitor, 50.68 g (0.7 mol) of acrylic acid was added. 0.477 g (0.2% of the resin component) of triphenylphosphine was added as a catalyst, and the temperature was then raised to 130° C. over 2 hours under constant stirring. The point where the temperature reached 130° C. was deemed 0 hours, and the reaction was subsequently continued at the same temperature for 10 hours, while sampling was conducted at 6 different points, namely after 0, 2, 4, 6, 8 and 10 hours respectively, thereby yielding a pale yellow, transparent, resin-like reaction mixture (I-2) containing a branched-polyether resin (X2). Each of the 6 samples was measured for viscosity [E-type viscometer, (25° C.)], acid value (of the solid fraction) and epoxy equivalent weight (of the solid fraction), and the results of a molecular weight distribution measurement using GPC were used to determine the number average molecular weight (Mn) and the weight average molecular weight (Mw). The results obtained are shown below in Table 2-1.

TABLE 2-1

| Time elapsed* (hours) | Viscosity (Pa · s) | Acid value (mgKOH/g) | Epoxy equivalent weight (g/equivalent) | Number average molecular weight (Mn) | Weight average molecular weight (Mw) |
|---|---|---|---|---|---|
| 0 | 17 | 5 | 970 | 546 | 705 |
| 2 | 252 | 0.2 | 986 | 901 | 1966 |
| 4 | 1127 | 0.1 | 991 | 1130 | 4255 |
| 6 | 1650 | 0.09 | 994 | 1198 | 5229 |
| 8 | 2010 | 0.07 | 993 | 1305 | 7063 |
| 10 | 2100 | 0.08 | 995 | 1410 | 7750 |

*Time elapsed: The time from the point where 130° C. was reached until the sampling time On the basis of the GPC measurement, the thus obtained reaction mixture (I-2) was found to contain the components shown below in Table 2-2. Furthermore, the epoxy equivalent weight (of the solid fraction) of the branched-polyether resin (X2), calculated in the same manner as the example 1 from the respective quantities of each component shown below in Table 2-2 and the epoxy equivalent weight (of the solid fraction) of the reaction mixture (I-2) after 10 hours had elapsed shown above in Table 2-1, was 2,240 g/equivalent.

TABLE 2-2

| Resin Component | Quantity (%) | | |
|---|---|---|---|
| Bisphenol A epoxy resin | | 7.1 | |
| Mono and diacrylate of bisphenol A epoxy resin | 17.7 | Monoacrylate Diacrylate | 11.7 6.0 |
| Branched-polyether resin (X2) | | 75.2 | |

An IR analysis was also conducted. The infrared absorption spectrum for the above reaction mixture (I-2) is shown in FIG. 1. By comparing the relative intensities of the broad hydroxyl group absorption at 3300 to 3600 cm$^{-1}$ and the alkyl group absorption at 2800 to 3100 cm$^{-1}$ it was evident that the quantity of hydroxyl groups within the reaction mixture (I-2) was small, indicating consumption of the hydroxyl groups. Furthermore, by comparing the relative intensities of the acryloyl group absorption at 1410 cm$^{-1}$ and the mono-substituted benzene ring absorption at 755 cm$^{-1}$ it was evident that approximately 50% of the acryloyl groups had been eliminated. Furthermore, the ether absorption in the vicinity of 1120 cm$^{-1}$ had increased, confirming that ether linkages had been formed by the reaction of acryloyl groups and hydroxyl groups. Subsequently, measurement of the hydroxyl group equivalent weight and the acryloyl concentration confirmed, in a similar manner to the infrared spectrum, that approximately 50 mol % of the hydroxyl groups and acryloyl groups had undergone reaction.

Subsequently, to 238.7 g of the solid fraction of the above reaction mixture (I-2) were added 17.3 g (0.24 mol: equivalent to 1 mol for each 1 mol of residual epoxy groups) of acrylic acid and 37.5 g of ethyl carbitol acetate, and the resulting mixture was reacted at 130° C. for 5 hours, yielding a pale yellow, transparent, resin-like branched-polyether resin composition (II-2) containing a branched-polyether resin (Y2). The epoxy equivalent weight (of the solid fraction) of the branched-polyether resin composition (II-2) was 21,100 g/equivalent, and the acid value (of the solid fraction) was 0.15 (mgKOH/g). The results of a molecular weight distribution measurement using GPC were used to determine the composition of the branched-polyether resin composition (II-2), the number average molecular weight (Mn), and the weight average molecular weight (Mw). The results obtained are shown below in Table 2-3.

TABLE 2-3

| Resin Component | Quantity |
|---|---|
| Bisphenol A epoxy resin diacrylate | 22% |
| Branched-polyether resin (Y2) | 78% |
| Branched-polyether resin composition (II-2) | Number average molecular weight (Mn): 1,510 Weight average molecular weight (Mw): 8,200 |

Subsequently, to 256 g of the solid fraction of the above branched-polyether resin composition (II-2) was added 78.5 g of ethyl carbitol acetate, the temperature inside the reaction system was lowered to 100° C., 76.6 g (0.504 mol) of tetrahydrophthalic anhydride was added, and the resulting mixture was reacted at 100° C. for 8 hours. At this point, the 1780 cm$^{-1}$ infrared absorption attributable to the acid anhydride group had been eliminated from the infrared absorption spectrum, confirming that the tetrahydrophthalic anhydride had reacted with the branched-polyether resin (Y2) and the diacrylate of the bisphenol A epoxy resin within the branched-polyether resin composition (II-2), yielding an acid pendant branched-polyether resin composition (III-2) containing an acid pendant branched-polyether resin (Z2). The acid value (of the solid fraction) of this acid pendant branched-polyether resin composition (III-2) was 84.8 (mgKOH/g). The results of a molecular weight distribution measurement using GPC were used to determine the composition of the acid pendant branched-polyether resin composition (III-2), the number average molecular weight (Mn), and the weight average molecular weight (Mw). The results obtained are shown below in Table 2-4.

TABLE 2-4

| Resin Component | Quantity |
|---|---|
| Acid pendant bisphenol A epoxy resin diacrylate | 20% |
| Acid pendant branched-polyether resin (Z2) | 80% |
| Acid pendant branched-polyether resin composition (III-2) | Number average molecular weight (Mn): 1,820 Weight average molecular weight (Mw): 9,500 |

Example 3

A flask fitted with a thermometer, a stirrer, and a reflux condenser was charged with 27.32 g of ethyl carbitol acetate, and following the dissolution of 188 g of a bisphenol A epoxy resin (epoxy equivalent weight: 188 g/equivalent; EPICLON 850, manufactured by Dainippon Ink and Chemicals, Incorporated) and the addition of 1 g of hydroquinone as a polymerization inhibitor, 57.92 g (0.8 mol) of acrylic acid was added. 0.49 g (0.2% of the resin component) of triphenylphosphine was added as a catalyst, and the temperature was then raised to 110° C. over 2 hours under constant stirring. The point where the temperature reached 110° C. was deemed 0 hours, and the reaction was subsequently continued at the same temperature for 8 hours, while sampling was conducted at 4 different points, namely after 2, 4, 6, and 8 hours respectively, thereby yielding a pale yellow, transparent, resin-like reaction mixture (I-3) containing a branched-polyether resin (X3). Each of the 4 samples was measured for viscosity [E-type viscometer, (25° C.)], acid value (of the solid fraction) and epoxy equivalent weight (of the solid fraction), and the results of a molecular weight distribution measurement using GPC were used to determine the number average molecular weight (Mn) and the weight average molecular weight (Mw). The results obtained are shown below in Table 3-1.

TABLE 3-1

| Time elapsed* (hours) | Viscosity (Pa · s) | Acid value (mgKOH/g) | Epoxy equivalent weight (g/equivalent) | Number average molecular weight (Mn) | Weight average molecular weight (Mw) |
|---|---|---|---|---|---|
| 2 | 5.9 | 35.5 | 730 | 530 | 647 |
| 4 | 21.0 | 0.2 | 1368 | 576 | 694 |
| 6 | 312 | 0.1 | 1651 | 984 | 2141 |
| 8 | 5407 | 0.08 | 1915 | 1422 | 7980 |

*Time elapsed: The time from the point where 110° C. was reached until the sampling time On the basis of the GPC measurement, the thus obtained reaction mixture (I-3) was found to contain the components shown below in Table 3-2. Furthermore, the epoxy equivalent weight (of the solid fraction) of the branched-polyether resin (X3), calculated in the same manner as the example 1 from the respective quantities of each component shown below in Table 3-2 and the epoxy equivalent weight (of the solid fraction) of the reaction mixture (I-3) after 8 hours had elapsed shown above in Table 3-1, was 4,448 g/equivalent.

TABLE 3-2

| Resin Component | Quantity (%) | | |
|---|---|---|---|
| Bisphenol A epoxy resin | 3.3 | | |
| Mono and diacrylate of bisphenol A epoxy resin | 14.0 | Monoacrylate | 7.2 |
| | | Diacrylate | 6.8 |
| Branched-polyether resin (X3) | 82.7 | | |

Subsequently, to 245.9 g of the solid fraction of the above reaction mixture (I-3) (equivalent to 273.2 g of the resin solution) were added 9.3 g (0.128 mol: equivalent to 1 mol for each 1 mol of residual epoxy groups) of acrylic acid and 36.5 g of ethyl carbitol acetate, and the resulting mixture was reacted at 130° C. for 5 hours, yielding a pale yellow, transparent, resin-like branched-polyether resin composition (II-3) containing a branched-polyether resin (Y3). The epoxy equivalent weight (of the solid fraction) of the branched-polyether resin composition (II-3) was 24,200 g/equivalent, and the acid value (of the solid fraction) was 0.16 (mgKOH/g). The results of a molecular weight distribution measurement using GPC were used to determine the composition of the branched-polyether resin composition (II-3), the number average molecular weight (Mn), and the weight average molecular weight (Mw). The results obtained are shown below in Table 3-3.

TABLE 3-3

| Resin Component | Quantity |
|---|---|
| Bisphenol A epoxy resin diacrylate | 15% |
| Branched-polyether resin (Y3) | 85% |
| Branched-polyether resin composition (II-3) | Number average molecular weight (Mn): 1,830 |
| | Weight average molecular weight (Mw): 9,400 |

Subsequently, to 255.2 g of the solid fraction of the above branched-polyether resin composition (II-3) was added 78.3 g of ethyl carbitol acetate, the temperature inside the reaction system was lowered to 100° C., 76.4 g (0.502 mol) of tetrahydrophthalic anhydride was added, and the resulting mixture was reacted at 100° C. for 8 hours. At this point, the 1780 $cm^{-1}$ infrared absorption attributable to the acid anhydride group had been eliminated from the infrared absorption spectrum, confirming that the tetrahydrophthalic anhydride had reacted with the branched-polyether resin (Y3) and the diacrylate of the bisphenol A epoxy resin within the branched-polyether resin composition (II-3), yielding an acid pendant branched-polyether resin composition (III-3) containing an acid pendant branched-polyether resin (Z3). The acid value (of the solid fraction) of this acid pendant branched-polyether resin composition (III-3) was 85.8 (mgKOH/g). The results of a molecular weight distribution measurement using GPC were used to determine the composition of the acid pendant branched-polyether resin composition (III-3), the number average molecular weight (Mn), and the weight average molecular weight (Mw). The results obtained are shown below in Table 3-4.

TABLE 3-4

| Resin Component | Quantity |
|---|---|
| Acid pendant bisphenol A epoxy resin diacrylate | 12% |
| Acid pendant branched-polyether resin (Z3) | 88% |
| Acid pendant branched-polyether resin composition (III-3) | Number average molecular weight (Mn): 2,090 |
| | Weight average molecular weight (Mw): 10,700 |

Example 4

A flask fitted with a thermometer, a stirrer, and a reflux condenser was charged with 58.5 g of ethyl carbitol acetate, and following the dissolution of 476 g of a bisphenol A epoxy resin (epoxy equivalent weight: 476 g/equivalent; EPICLON 1050, manufactured by Dainippon Ink and Chemicals, Incorporated) and the addition of 1 g of hydroquinone as a polymerization inhibitor, 50.68 g (0.7 mol) of acrylic acid was added. 1.05 g (0.2% of the resin component) of triphenylphosphine was added as a catalyst, and the temperature was then raised to 130° C. over 2 hours under constant stirring. The point where the temperature reached 130° C. was deemed 0 hours, and the reaction was subsequently continued at the same temperature for 8 hours, while sampling was conducted at 5 different points, namely after 0, 2, 4, 6, and 8 hours respectively, thereby yielding a pale yellow, transparent, resin-like reaction mixture (I-4) containing a branched-polyether resin (X4). Each of the 5 samples was measured for acid value (of the solid fraction) and epoxy equivalent weight (of the solid fraction), and the results of a molecular weight distribution measurement using GPC were used to determine the number average molecular weight (Mn) and the weight average molecular weight (Mw). The results obtained are shown below in Table 4-1.

TABLE 4-1

| Time elapsed* (hours) | Acid value (mgKOH/g) | Epoxy equivalent weight (g/equivalent) | Number average molecular weight (Mn) | Weight average molecular weight (Mw) |
|---|---|---|---|---|
| 0 | 2.3 | 1846 | 1037 | 1940 |
| 2 | 1.0 | 1960 | 1255 | 2097 |
| 4 | 0.7 | 2050 | 1265 | 3090 |
| 6 | 0.5 | 2100 | 1415 | 4229 |
| 8 | 0.1 | 2150 | 1517 | 5206 |

*Time elapsed: The time from the point where 130° C. was reached until the sampling time On the basis of the GPC measurement, the thus obtained reaction mixture (I-4) was found to contain the components shown below in Table 4-2. Furthermore, the epoxy equivalent weight (of the solid fraction) of the branched-polyether resin, calculated in the same manner as the example 1 from the respective quantities of each component shown below in Table 4-2 and the epoxy equivalent weight (of the solid fraction) of the reaction mixture (I-4) after 8 hours had elapsed shown above in Table 4-1, was 3,895 g/equivalent.

TABLE 4-2

| Resin Component | Quantity (%) | | |
|---|---|---|---|
| Bisphenol A epoxy resin | | 8.3 | |
| Mono and diacrylate of bisphenol A epoxy resin | 21.7 | Monoacrylate | 11.0 |
| | | Diacrylate | 10.7 |
| Branched-polyether resin (X4) | | 70.0 | |

Subsequently, to 526.7 g of the solid fraction of the above reaction mixture (I-4) (equivalent to 585.2 g of the resin solution) were added 17.7 g (0.245 mol: equivalent to 1 mol for each 1 mol of residual epoxy groups) of acrylic acid and 77.6 g of ethyl carbitol acetate, and the resulting mixture was reacted at 130° C. for 5 hours, yielding a pale yellow, transparent, resin-like branched-polyether resin composition (II-4) containing a branched-polyether resin (Y4). The epoxy equivalent weight (of the solid fraction) of the branched-polyether resin composition (II-4) was 19,800 g/equivalent, and the acid value (of the solid fraction) was 0.11 (mgKOH/g). The results of a molecular weight distribution measurement using GPC were used to determine the composition of the branched-polyether resin composition (II-4), the number average molecular weight (Mn), and the weight average molecular weight (Mw). The results obtained are shown below in Table 4-3.

TABLE 4-3

| Resin Component | Quantity |
|---|---|
| Bisphenol A epoxy resin diacrylate | 28% |
| Branched-polyether resin (Y4) | 72% |
| Branched-polyether resin composition (II-4) | Number average molecular weight (Mn): 1,780 Weight average molecular weight (Mw): 6,400 |

Subsequently, to 544.4 g of the solid fraction of the above branched-polyether resin composition (II-4) was added 167.0 g of ethyl carbitol acetate, the temperature inside the reaction system was lowered to 100° C., 162.9 g (1.072 mol) of tetrahydrophthalic anhydride was added, and the resulting mixture was reacted at 100° C. for 8 hours. At this point, the 1780 $cm^{-1}$ infrared absorption attributable to the acid anhydride group had been eliminated from the infrared absorption spectrum, confirming that the tetrahydrophthalic anhydride had reacted with the branched-polyether resin (Y4) and the diacrylate of the bisphenol A epoxy resin within the branched-polyether resin composition (II-4), yielding an acid pendant branched-polyether resin composition (III-4) containing an acid pendant branched-polyether resin (Z4). The acid value (of the solid fraction) of this acid pendant branched-polyether resin composition (III-4) was 85.2 (mgKOH/g). The results of a molecular weight distribution measurement using GPC were used to determine the composition of the acid pendant branched-polyether resin composition (III-4), the number average molecular weight (Mn), and the weight average molecular weight (Mw). The results obtained are shown below in Table 4-4.

TABLE 4-4

| Resin Component | Quantity |
|---|---|
| Acid pendant bisphenol A epoxy resin diacrylate | 25% |
| Acid pendant branched-polyether resin (Z4) | 75% |
| Acid pendant branched-polyether resin composition (III-4) | Number average molecular weight (Mn): 2,200 Weight average molecular weight (Mw): 7,560 |

Example 5

A flask fitted with a thermometer, a stirrer, and a reflux condenser was charged with 26.3 g of ethyl carbitol acetate, and following the dissolution of 186 g of a tetramethylbiphenyl epoxy resin (epoxy equivalent weight: 186 g/equivalent; YX-4000, manufactured by Japan Epoxy Resins Co., Ltd.), and the addition of 1 part of hydroquinone as a polymerization inhibitor, 50.4 g (0.7 mol) of acrylic acid was added. 0.236 g (0.1% of the resin component) of triphenylphosphine was added as a catalyst, the temperature was then raised to 130° C. over 2 hours under constant stirring, and additional quantities of 0.236 g of triphenylphosphine were added 4 hours and then 7 hours after the temperature had reached 130° C. The point where the temperature reached 130° C. was deemed 0 hours, and the reaction was continued at the same temperature for 10 hours, while sampling was conducted at 5 different points, namely after 0, 1, 5, 8 and 10 hours respectively, thereby yielding a pale yellow, transparent, resin-like reaction mixture (I-5) containing a branched-polyether resin (X5). Each of the 5 samples was measured for viscosity [E-type viscometer, (25° C.)], acid value (of the solid fraction) and epoxy equivalent weight (of the solid fraction), and the results of a molecular weight distribution measurement using GPC were used to determine the number average molecular weight (Mn) and the weight average molecular weight (Mw). The results obtained are shown below in Table 5-1.

TABLE 5-1

| Time elapsed* (hours) | Viscosity (Pa·s) | Acid value (mgKOH/g) | Epoxy equivalent weight (g/equivalent) | Number average molecular weight (Mn) | Weight average molecular weight (Mw) |
|---|---|---|---|---|---|
| 0 | 34.0 | 9.4 | 575 | 831 | 1062 |
| 1 | 85.4 | 1.1 | 976 | 1105 | 1581 |
| 5 | 200.1 | 1.0 | 984 | 1318 | 2549 |
| 8 | 1579 | 1.0 | 989 | 1598 | 4964 |
| 10 | 1712 | 0.9 | 992 | 1866 | 8387 |

*Time elapsed: The time from the point where 130° C. was reached until the sampling time On the basis of the GPC measurement, the thus obtained reaction mixture (I-5) was found to contain the components shown below in Table 5-2. Furthermore, the epoxy equivalent weight (of the solid fraction) of the branched-polyether resin (X5), calculated in the same manner as the example 1 from the respective quantities of each component shown below in Table 5-2 and the epoxy equivalent weight (of the solid fraction) of the reaction mixture (I-5) after 10 hours had elapsed shown above in Table 5-1, was 1,776 g/equivalent.

TABLE 5-2

| Resin Component | Quantity (%) | | |
|---|---|---|---|
| Tetramethylbiphenyl epoxy resin | | 5.4 | |
| Mono and diacrylate of tetramethylbiphenyl epoxy resin | 28.7 | Monoacrylate | 16.4 |
| | | Diacrylate | 12.3 |
| Branched-polyether resin (X5) | | 65.9 | |

Subsequently, to 236.4 g of the solid fraction of the above reaction mixture (I-5) (equivalent to 262.7 g of the resin solution) were added 17.2 g (0.238 mol: equivalent to 1 mol for each 1 mol of residual epoxy groups) of acrylic acid and 37.1 g of ethyl carbitol acetate, and the resulting mixture was reacted at 130° C. for 5 hours, yielding a pale yellow, transparent, resin-like branched-polyether resin composition (II-5) containing a branched-polyether resin (Y5). The epoxy equivalent weight (of the solid fraction) of the branched-polyether resin composition (II-5) was 20,900 g/equivalent, and the acid value (of the solid fraction) was 0.20 (mgKOH/g). The results of a molecular weight distribution measurement using GPC were used to determine the composition of the branched-polyether resin composition (II-5), the number average molecular weight (Mn), and the weight average molecular weight (Mw). The results obtained are shown below in Table 5-3.

TABLE 5-3

| Resin Component | Quantity |
|---|---|
| Bisphenol A epoxy resin diacrylate | 33% |
| Branched-polyether resin (Y5) | 67% |
| Branched-polyether resin composition (II-5) | Number average molecular weight (Mn): 2,800 |
| | Weight average molecular weight (Mw): 9,480 |

Subsequently, to 253.6 g of the solid fraction of the above branched-polyether resin composition (II-5) was added 77.8 g of ethyl carbitol acetate, the temperature inside the reaction system was lowered to 100° C., 75.9 g (0.5 mol) of tetrahydrophthalic anhydride was added, and the resulting mixture was reacted at 100° C. for 8 hours. At this point, the 1780 cm$^{-1}$ infrared absorption attributable to the acid anhydride group had been eliminated from the infrared absorption spectrum, confirming that the tetrahydrophthalic anhydride had reacted with the branched-polyether resin (Y5) and the diacrylate of the bisphenol A epoxy resin within the branched-polyether resin composition (II-5), yielding an acid pendant branched-polyether resin composition (III-5). The acid value (of the solid fraction) of this acid pendant branched-polyether resin composition (III-5) was 85.7 (mgKOH/g). The results of a molecular weight distribution measurement using GPC were used to determine the composition of the acid pendant branched-polyether resin composition (III-5), the number average molecular weight (Mn), and the weight average molecular weight (Mw). The results obtained are shown below in Table 5-4.

TABLE 5-4

| Resin Component | Quantity |
|---|---|
| Acid pendant bisphenol A epoxy resin diacrylate | 29% |
| Acid pendant branched-polyether resin (Z5) | 71% |
| Acid pendant branched-polyether resin composition (III-5) | Number average molecular weight (Mn): 3,200 |
| | Weight average molecular weight (Mw): 10,800 |

Example 6

To 238.7 g of the solid fraction of the reaction mixture (I-2) obtained in the example 2 were added 20.6 g (0.24 mol: equivalent to 1 mol for each 1 mol of residual epoxy groups) of methacrylic acid and 38.3 g of ethyl carbitol acetate, and the resulting mixture was reacted at 130° C. for 5 hours, yielding a pale yellow, transparent, resin-like branched-polyether resin composition (II-6) containing a branched-polyether resin (Y6). The epoxy equivalent weight (of the solid fraction) was 24,100 g/equivalent, and the acid value (of the solid fraction) was 0.25 (mgKOH/g). The results of a molecular weight distribution measurement using GPC were used to determine the composition of the branched-polyether resin composition (II-6), the number average molecular weight (Mn), and the weight average molecular weight (Mw). The results obtained are shown below in Table 6-1.

TABLE 6-1

| Resin Component | Quantity |
| --- | --- |
| Bisphenol A epoxy resin di(meth)acrylate | 22% |
| Branched-polyether resin (Y6) | 78% |
| Branched-polyether resin composition (II-6) | Number average molecular weight (Mn): 1,740<br>Weight average molecular weight (Mw): 8,600 |

Subsequently, to 259 g of the solid fraction of the above branched-polyether resin composition (II-6) was added 72.7 g of ethyl carbitol acetate, the temperature inside the reaction system was lowered to 100° C., 61.5 g (0.4 mol) of hexahydrophthalic anhydride was added, and the resulting mixture was reacted at 100° C. for 8 hours. At this point, the 1780 cm$^{-1}$ infrared absorption attributable to the acid anhydride group had been eliminated from the infrared absorption spectrum, confirming that the hexahydrophthalic anhydride had reacted with the branched-polyether resin (Y6) and the di(meth)acrylate of the bisphenol A epoxy resin within the branched-polyether resin composition (II-6), yielding an acid pendant branched-polyether resin composition (III-6). The acid value (of the solid fraction) of this acid pendant branched-polyether resin composition (III-6) was 71.1 (mgKOH/g). The results of a molecular weight distribution measurement using GPC were used to determine the composition of the acid pendant branched-polyether resin composition (III-6), the number average molecular weight (Mn), and the weight average molecular weight (Mw). The results obtained are shown below in Table 6-2.

TABLE 6-2

| Resin Component | Quantity |
| --- | --- |
| Acid pendant bisphenol A epoxy resin di(meth)acrylate | 20% |
| Acid pendant branched-polyether resin (Z6) | 80% |
| Acid pendant branched-polyether resin composition (III-6) | Number average molecular weight (Mn): 2,140<br>Weight average molecular weight (Mw): 9,760 |

Example 7

In a flask fitted with a thermometer, a stirrer, and a reflux condenser was dissolved 188 g of a bisphenol A epoxy resin (epoxy equivalent weight: 188 g/equivalent; EPICLON 850, manufactured by Dainippon Ink and Chemicals, Incorporated), and following the addition of 1 g of BHT (2,6-di-tertiary-butyl-4-methylphenol) as a polymerization inhibitor, 28.8 g (0.4 mol) of acrylic acid and 34.4 g (0.4 mol) of methacrylic acid were added. 1.26 g (0.5% of the resin component) of triphenylphosphine was added as a catalyst, and the temperature was then raised to 130° C. over 1 hour under constant stirring. The point where the temperature reached 130° C. was deemed 0 hours, and the reaction was subsequently continued at the same temperature for 5 hours, while sampling was conducted after 0, 1, 3 and 5 hours respectively, thereby yielding a pale yellow, transparent, resin-like reaction mixture (I-7) containing a branched-polyether resin (X7). Each of the samples was measured for viscosity [using the Gardner method (at 25° C. using an E-type viscometer)], acid value (of the solid fraction) and epoxy equivalent weight (of the solid fraction), and the results of a molecular weight distribution measurement using GPC (gel permeation chromatography) were used to determine the number average molecular weight (Mn) and the weight average molecular weight (Mw). The results obtained are shown below in Table 7-1.

TABLE 7-1

| Time elapsed* (hours) | Viscosity (Pa · s) | Acid value (mgKOH/g) | Epoxy equivalent weight (g/equivalent) | Number average molecular weight (Mn) | Weight average molecular weight (Mw) |
| --- | --- | --- | --- | --- | --- |
| 0 | A1 | 17.2 | 818 | 770 | 860 |
| 1 | I-J | 0.4 | 1530 | 1890 | 6940 |
| 3 | M-N | 0.1 | 1560 | 2000 | 9130 |
| 5 | N | 0.1 | 1570 | 2000 | 9220 |

*Time elapsed: The time from the point where 130° C. was reached until the sampling time On the basis of the GPC measurement, the thus obtained reaction mixture (I-7) was found to contain the components shown below in Table 7-2. Furthermore, the epoxy equivalent weight of the branched-polyether resin (X7), calculated from the respective quantities of each component shown below in Table 7-2 and the epoxy equivalent weight of the reaction mixture (I-7) after 10 hours had elapsed shown above in Table 7-1, was 2,604. This epoxy equivalent weight of the branched-polyether resin (X7) was calculated using the equation 100/[epoxy equivalent weight of the branched-polyether resin composition 1]=[(quantity of bisphenol A epoxy resin)/(epoxy equivalent weight thereof)+(quantity of epoxy group-containing bisphenol A epoxy mono(meth)acrylate)/(epoxy equivalent weight thereof)+(quantity of branched-polyether resin (X7)/(epoxy equivalent weight thereof)}, in other words, 100/1570=[(1.4/188)+(13.1/455)+(71.5/epoxy equivalent weight of the branched-polyether resin (X7)]. The epoxy equivalent weight of the epoxy group-containing bisphenol A epoxy mono(meth)acrylate was calculated as an average epoxy equivalent weight assuming that the epoxy group-containing bisphenol A epoxy monoacrylate and the epoxy group-containing bisphenol A epoxy monomethacrylate were present in equimolar quantities.

An IR (infrared absorption spectral) analysis was also conducted. As a result of this analysis, by comparing the relative intensities of the broad hydroxyl group absorption at 3300 to 3600 cm$^{-1}$ and the alkyl group absorption at 2800 to 3100 cm$^{-1}$ it was evident that the quantity of hydroxyl groups within the reaction mixture (I-7) was small, indicating consumption of the hydroxyl groups. Furthermore, from the relative intensity of the acryloyl group absorption at 1410 cm$^{-1}$ it was evident that approximately 50% of the acryloyl groups had been eliminated. Furthermore, the ether absorption in the vicinity of 1120 cm$^{-1}$ had increased, confirming that ether linkages had been formed by the reaction of acryloyl groups and hydroxyl groups.

TABLE 7-2

| Resin Component | Quantity (%) | | |
|---|---|---|---|
| Bisphenol A epoxy resin | | 1.4 | |
| Mono and di(meth)acrylate of bisphenol A epoxy resin | 27.1 | Mono(meth)acrylate<br>Di(meth)acrylate | 13.1<br>14.0 |
| Branched-polyether resin (X7) | | 71.5 | |

Subsequently, to the above reaction mixture (I-7) were added 66.2 g of ethyldiglycol acetate (EDGA) and 13.7 g (0.16 mol) of methacrylic acid, and the resulting mixture was reacted at 130° C. for 8 hours, yielding a branched-polyether resin composition (II-7) containing a branched-polyether resin (Y7). The epoxy equivalent weight (of the solid fraction) of the branched-polyether resin composition (II-7) was 23,000 g/equivalent, and the acid value (of the solid fraction) was 0.5 (mgKOH/g). The results of a molecular weight distribution measurement using GPC were used to determine the composition of the branched-polyether resin composition, the number average molecular weight (Mn), and the weight average molecular weight (Mw). The results obtained are shown below in Table 7-3.

TABLE 7-3

| Resin Component | Quantity |
|---|---|
| Bisphenol A epoxy resin di(meth)acrylate | 26% |
| Branched-polyether resin (Y7) | 74% |
| Branched-polyether resin composition (II-7) | Number average molecular weight (Mn): 2,100<br>Weight average molecular weight (Mw): 9,900 |

Subsequently, to 100 g of the resin solid fraction of the above branched-polyether resin composition (II-7) was added 3 g of ethyldiglycol acetate, 28 g of an aromatic petroleum-based solvent (SOLVESSO 150) and 30 g of tetrahydrophthalic anhydride, and the resulting mixture was reacted at 100° C. for 10 hours, yielding an acid pendant branched-polyether resin composition (III-7). At this point, the 1850 cm$^{-1}$ infrared absorption attributable to the acid anhydride group had been completely eliminated from the infrared absorption spectrum. The acid value of the solid fraction of the composition was 86 mgKOH/g. The results of a molecular weight distribution measurement using GPC were used to determine the composition of the acid pendant branched-polyether resin composition, the number average molecular weight, and the weight average molecular weight (Mw). The results obtained are shown below in Table 7-4.

TABLE 7-4

| Resin Component | Quantity |
|---|---|
| Acid pendant bisphenol A epoxy resin di(meth)acrylate | 26% |
| Acid pendant branched-polyether resin (Z7) | 74% |
| Acid pendant branched-polyether resin composition (III-7) | Number average molecular weight (Mn): 2,200<br>Weight average molecular weight (Mw): 11,000 |

Comparative Example 1

A flask fitted with a thermometer, a stirrer, and a reflux condenser was charged with 28.9 g of ethyl carbitol acetate, and following the dissolution of 188 g of a bisphenol A epoxy resin (epoxy equivalent weight: 188 g/equivalent; EPICLON 850, manufactured by Dainippon Ink and Chemicals, Incorporated) and the addition of 0.5 g of hydroquinone as a polymerization inhibitor, 72 g (1 mol) of acrylic acid and 0.52 g (0.2% of the resin component) of triphenylphosphine were added, and the temperature was then raised to 130° C. over 2 hours under constant stirring. The point where the temperature reached 130° C. was deemed 0 hours, and the reaction was subsequently continued at the same temperature for 10 hours, while sampling was conducted at 6 different points, namely after 1, 3, 4.5, 6, 8 and 10 hours respectively, before the reaction mixture was then removed from the flask, yielding a pale yellow, transparent, resin-like resin (R-1). Each of the 6 samples was measured for viscosity [E-type viscometer, (25° C.)], acid value (of the solid fraction) and epoxy equivalent weight (of the solid fraction), and the results of a molecular weight distribution measurement using GPC were used to determine the number average molecular weight (Mn) and the weight average molecular weight (Mw). The results of the GPC analyses showed little variation in the molecular weight between the point immediately following reaction initiation and the point 10 hours after reaction initiation, and it was evident that the resin (R-1) was the diacrylate produced by reaction between the epoxy groups at the terminals of the bisphenol A epoxy resin and the acrylic acid. In other words, only a diacrylate of the aromatic difunctional epoxy resin exists within the reaction system, and because the system contains no monoacrylate of the aromatic difunctional epoxy resin nor aromatic bifunctional epoxy resin, no reaction can occur between the hydroxyl groups and acryloyl groups within the diacrylate of the aromatic difunctional epoxy resin, meaning the synthesis of a branched-polyether resin containing a hydroxyl group, an acryloyl group and an epoxy group does not occur, and meaning the product resin is different from the above reaction mixture (I-2) obtained using the production method of the present invention. The results obtained are shown below in Table 1'-1.

TABLE 1'-1

| Time elapsed* (hours) | Viscosity (Pa·s) | Acid value (mgKOH/g) | Epoxy equivalent weight (g/equivalent) | Number average molecular weight (Mn) | Weight average molecular weight (Mw) |
|---|---|---|---|---|---|
| 1 | 14.7 | 24 | 2890 | 622 | 737 |
| 3 | 47.5 | 1.2 | 14,200 | 670 | 789 |
| 4.5 | 54.1 | 1.0 | 25,200 | 675 | 811 |
| 6 | 59.1 | 0.9 | 27,300 | 685 | 838 |
| 8 | 63.3 | 0.9 | 28,900 | 705 | 844 |
| 10 | 64.3 | 0.8 | 29,100 | 710 | 853 |

Figure 2:
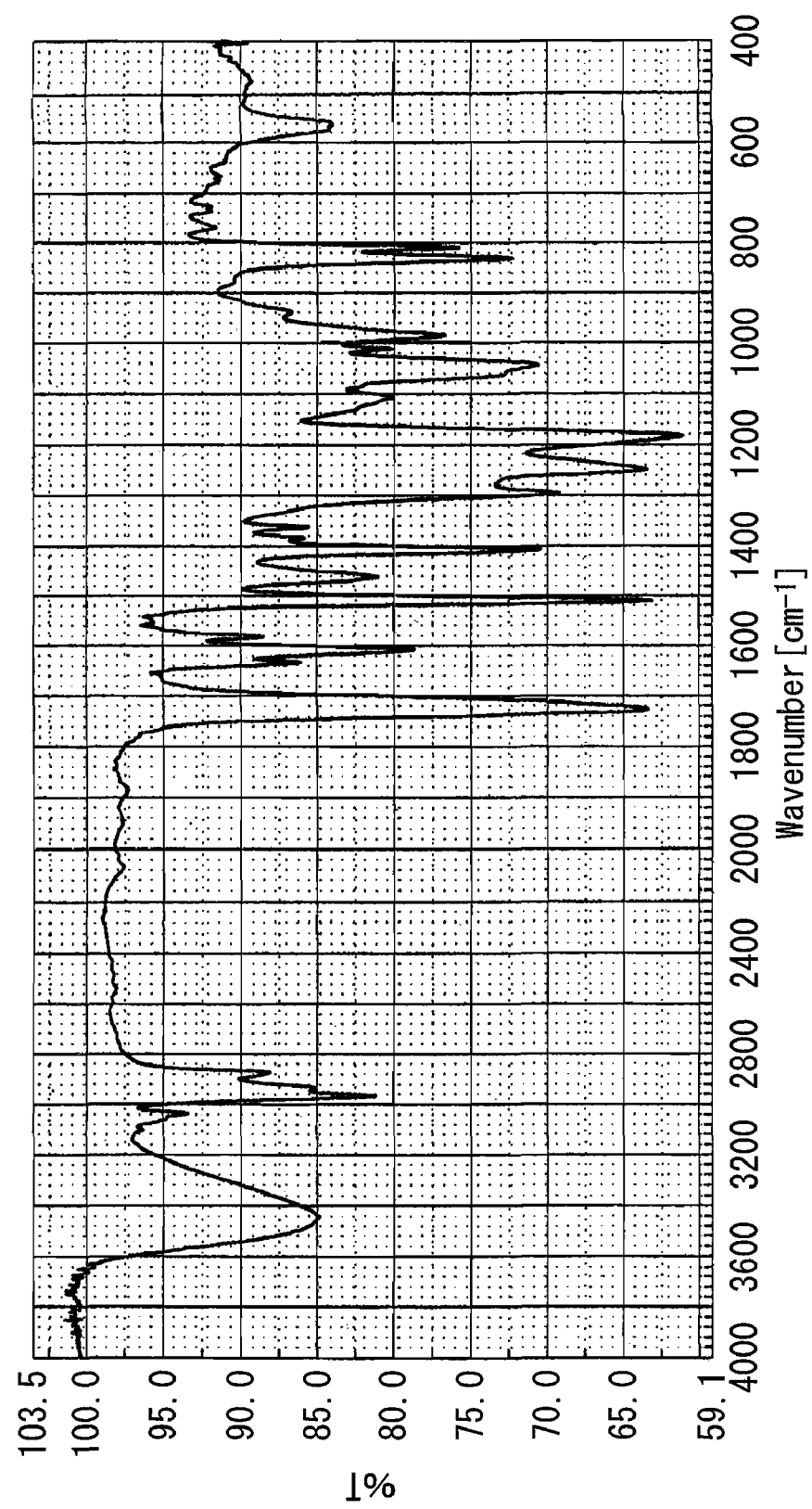
FIG. 2 is an infrared absorption spectrum for a resin material obtained in a comparative example 1.

*Time elapsed: The time from the point where 130° C. was reached until the sampling time The infrared absorption spectrum for the above comparative resin (R-1) is shown in FIG. 2. In FIG. 2, by comparing the relative intensities of the broad hydroxyl group absorption at 3300 to 3600 cm$^{-1}$ and the alkyl group absorption at 2800 to 3100 cm$^{-1}$, and conducting a comparison with the intensity of the hydroxyl group absorption of the above reaction mixture (I-2), it was evident that the intensity of the hydroxyl group absorption for the comparative resin (R-1) shown in FIG. 2 was very strong, indicating a larger quantity of residual hydroxyl groups than was the case for the aforementioned reaction mixture (I-2). Furthermore, by comparing the relative intensities of the acryloyl group absorption at 1410 cm$^{-1}$ and the mono-substituted benzene ring absorption at 755 cm$^{-1}$ it was evident that most of the acryloyl groups remain unreacted.

Subsequently, to 260 g of the solid fraction of the above comparative resin (R-1) was added 79.8 g of ethyl carbitol acetate, the temperature inside the reaction system was lowered to 100° C., 77.8 g (0.512 mol) of tetrahydrophthalic anhydride was added, and the resulting mixture was reacted at 100° C. for 8 hours. At this point, the 1780 cm$^{-1}$ infrared absorption attributable to the acid anhydride group had been eliminated from the infrared absorption spectrum, confirming that the tetrahydrophthalic anhydride had reacted with the comparative resin (R-1), yielding an acid pendant bisphenol A epoxy acrylate resin (RZ-1). The acid value (of the solid fraction) of RZ-1 was 85.1 (mgKOH/g). The results of a molecular weight distribution measurement using GPC were used to determine the number average molecular weight (Mn) and the weight average molecular weight (Mw) of the acid pendant bisphenol A epoxy acrylate resin (RZ-1), and revealed a number average molecular weight of 780 and a weight average molecular weight of 960.

Comparative Example 2

A flask fitted with a thermometer, a stirrer, and a reflux condenser was charged with 428 g of ethyl carbitol acetate, and following the dissolution of 188 g of a bisphenol A epoxy resin (epoxy equivalent weight: 188 g/equivalent; EPICLON 850, manufactured by Dainippon Ink and Chemicals, Incorporated) and the addition of 0.5 g of hydroquinone as a polymerization inhibitor, 144 g (2 mol) of acrylic acid and 0.52 g (0.2% of the resin component) of triphenylphosphine were added, and the temperature was then raised to 130° C. over 2 hours under constant stirring. Within approximately 1 hour of the temperature reaching 130° C., intense heat generation occurred, leading to gelling of the mixture.

Comparative Example 3

A flask fitted with a thermometer, a stirrer, and a reflux condenser was charged with 72 g of ethyl carbitol acetate, and following the dissolution of 215 g of a cresol novolak epoxy resin (epoxy equivalent weight: 215 g/equivalent; EPICLON N-673, manufactured by Dainippon Ink and Chemicals, Incorporated) and the addition of 0.5 g of hydroquinone as a polymerization inhibitor, 72 g (1 mol) of acrylic acid and 0.52 g (0.2% of the resin component) of triphenylphosphine were added, and the temperature was then raised to 120° C. over 2 hours under constant stirring. Reaction was conducted for approximately 15 hours from the point where the temperature reached 120° C., yielding a cresol novolak epoxy acrylate resin. Subsequently, the temperature inside the reaction system was lowered to 100° C., 91.2 g (0.6 mol) of tetrahydrophthalic anhydride was added, and the resulting mixture was reacted at this temperature for 10 hours. Following confirmation that the absorption attributable to the acid anhydride group had been eliminated from the infrared absorption spectrum, the reaction product was removed from the flask, yielding an acid pendant epoxy acrylate resin (RZ-3). The acid value (of the solid fraction) was 91 mgKOH/g.

Applied Examples 1 to 7, and Comparative Applied Examples 1 and 2

Using the acid pendant branched-polyether resin compositions (III-2) to (III-7) obtained in the examples 2 to 7, the resins (RZ-1) and (RZ-3) obtained in the comparative examples 1 and 3, an ethyl carbitol acetate solution of a cresol novolak epoxy resin [EPICLON N-680: epoxy equivalent weight: 214 g/equivalent (hereafter abbreviated as N680)] with a non-volatile fraction of 70%, dipentaerythritol hexaacrylate (hereafter abbreviated as DPHA), and Irgacure 907 (a photopolymerization initiator manufactured by Ciba Geigy Corporation), resist ink compositions (W-1) to (W-6), and (RW-1) to (RW-2) were prepared with the formulations shown below in Table 8 and Table 9. Because the resin of the comparative example 2 gelled, it could not be evaluated as a comparative applied example.

TABLE 8

| Item | Applied Example | | | | | |
|---|---|---|---|---|---|---|
| | 1 | 2 | 3 | 4 | 5 | 6 |
| III-2 (solid fraction) (parts) | 62 | | | | | |
| III-3 (solid fraction) (parts) | | 62 | | | | |
| III-4 (solid fraction) (parts) | | | 62 | | | |
| III-5 (solid fraction) (parts) | | | | 62 | | |
| III-6 (solid fraction) (parts) | | | | | 62 | |
| III-7 (solid fraction) (parts) | | | | | | 62 |
| RZ-1 (solid fraction) (parts) | | | | | | |
| RZ-3 (solid fraction) (parts) | | | | | | |
| N680 (solid fraction) (parts) | 23 | 23 | 23 | 23 | 23 | 23 |
| DPHA (parts) | 8 | 8 | 8 | 8 | 8 | 8 |
| Irgacure 907 (parts) | 7 | 7 | 7 | 7 | 7 | 7 |

TABLE 8-continued

|  | Applied Example | | | | | |
|---|---|---|---|---|---|---|
| Item | 1 | 2 | 3 | 4 | 5 | 6 |
| Name of resist ink composition | W-1 | W-2 | W-3 | W-4 | W-5 | W-6 |

TABLE 8

| Item | Comparative Applied Example | |
|---|---|---|
|  | 1 | 2 |
| III-2 (solid fraction) (parts) | | |
| III-3 (solid fraction) (parts) | | |
| III-4 (solid fraction) (parts) | | |
| III-5 (solid fraction) (parts) | | |
| III-6 (solid fraction) (parts) | | |
| III-7 (solid fraction) (parts) | | |
| RZ-1 (solid fraction) (parts) | 62 | |
| RZ-3 (solid fraction) (parts) | | 62 |
| N680 (solid fraction) (parts) | 23 | 23 |
| DPHA (parts) | 8 | 8 |
| Irgacure 907 (parts) | 7 | 7 |
| Name of resist ink composition | RW-1 | RW-2 |

Subsequently, each of the thus obtained resist ink compositions (W-1) to (W-6) and (RW-1) to (RW-2) was evaluated for tack-free drying properties, developing properties, sensitivity, stability upon solvent drying, flexibility of the coating film, and heat resistance of the coating film. The evaluation methods are described below. Furthermore, the results obtained are shown in Tables 10 and 11.

(1) Tack-free Drying Property 1

Each resist ink composition was applied with an applicator to a glass epoxy substrate, in sufficient quantity to form a dried coating film thickness of 40 μm, the composition was dried by heating at 80° C. for 30 minutes, and following cooling to room temperature (23° C.), the tackiness of the coating film to finger touch was evaluated using the following criteria.

Evaluation Criteria:

○: no tackiness detected
Δ: slight tackiness detected
x: tackiness detected (2) Tack-free Drying Property 2

Each resist ink composition was applied with an applicator to a glass epoxy substrate, in sufficient quantity to form a dried coating film thickness of 40 μm, the composition was dried by heating at 80° C. for 30 minutes, and following cooling to room temperature (23° C.), a step tablet for evaluating sensitivity (step tablet No. 2, manufactured by Kodak Company) was placed on the surface of the dried coating film, and the resulting structure was irradiated with ultraviolet light. The ultraviolet light irradiation was conducted under vacuum reduced pressure conditions using a 7 kW metal halide lamp (HTE-106-M07, manufactured by Hi-Tech Co., Ltd.), and following irradiation with an accumulated light intensity of 800 mJ/cm², the system was returned to normal pressure, and the tackiness generated upon removal of the step tablet from the surface of the coating film was evaluated using the following criteria.

Evaluation Criteria:

○: no feeling of tackiness, with the step tablet able to be removed easily
Δ: slight feeling of tackiness, with the step tablet catching, but still being removable
x: considerable tackiness, with ink adhered to the step tablet, and the step tablet difficult to remove (3) Developing Properties Each resist ink composition was applied with an applicator to a tin sheet substrate, in sufficient quantity to form a dried coating film thickness of 40 μm, the resulting structure was left to stand for 30 minutes in an 80° C. dryer to volatilize the solvent, and following standing at room temperature, the structure was immersed for 120 seconds in a 1% aqueous solution of sodium carbonate at 30° C., and the degree to which the coating film remained on the substrate was evaluated using the following criteria.

Evaluation Criteria:

○: absolutely no coating film left on the substrate
Δ: a portion of the coating film left on the substrate
x: the coating film on the substrate does not dissolve and is substantially retained (4) Sensitivity (Resist Ink Sensitivity)

Samples were prepared by screen printing each of the resist ink compositions onto a glass epoxy substrate, and then each sample was left to stand for 30 minutes in an 80° C. dryer to volatilize the solvent, a step tablet (step tablet No. 2, manufactured by Kodak Company) was placed on the surface of the coating film, the sample was irradiated with ultraviolet light with an accumulated light intensity of 400 mJ/cm², 600 mJ/cm² or 800 mJ/cm² using a 7 kW metal halide lamp (HTE-106-M07, manufactured by Hi-Tech Co., Ltd.), the step tablet was removed from the sample surface, the sample was immersed for 120 seconds in a 1% aqueous solution of sodium carbonate at 30° C., and the sample was then evaluated using a step tablet method. The numbers shown in the tables represent the step number of the step tablet, and larger numbers indicate a superior level of curability (sensitivity).

(5) Stability upon Solvent Drying (Drying Control Range)

Tin sheets (test pieces) were prepared by using an applicator to apply each of the resist ink compositions in sufficient quantity to form a dried coating film thickness of 40 μm, each test piece was left to stand for 30 minutes, 40 minutes or 50 minutes in a 90° C. dryer to volatilize the solvent and was then developed by immersion for 120 seconds in a 1% aqueous solution of sodium carbonate at 30° C., and the drying control range (the stability upon solvent drying) was then evaluated visually using the following criteria.

Evaluation Criteria:

○: absolutely no coating film left on the substrate
Δ: a portion of the coating film left on the substrate
x: the coating film on the substrate does not dissolve and is substantially retained (6) Flexibility of Coating Film (Erichsen Test)

Tin sheets (test pieces) were prepared by using an applicator to apply each of the resist ink compositions in sufficient quantity to form a dried coating film thickness of 40 μm, each test piece was dried for 30 minutes in a 90° C. dryer, subsequently irradiated with ultraviolet light with an intensity of 800 mJ/cm² using a 7 kW metal halide lamp (HTE-106-M07, manufactured by Hi-Tech Co., Ltd.), and then cured by heating at 150° C. for 1 hour. Each test piece was then cut into 5 cm square tin sheets, and an Erichsen test was conducted under conditions at 23° C., using an automatic Erichsen tester manufactured by Ueshima Seisakusho Co., Ltd. In this evaluation, the coating film is pushed up by a punch, and the raising of the punch is halted when the coating either lifts off or peels away from the tin sheet substrate, or develops cracking, the height that the punch has been raised is read from the testing machine, and the average of four test values is used as the result.

(7) Heat Resistance of Coating Film (Solder Heat Resistance)

A test piece was prepared by screen printing the resist ink composition onto a glass fabric based epoxy resin copper clad laminate in which a test pattern had been formed, using a quantity of the composition sufficient to form a dried film thickness of 20 μm, and the test piece was then dried for 30 minutes in an 80° C. dryer, subsequently irradiated with ultraviolet light with an intensity of 800 mJ/cm² using a 7 kW metal halide lamp, and then cured by heating at 150° C. for 1 hour. Subsequently, a rosin-based flux was applied to the cured test piece, the test piece was immersed for 30 seconds in a molten solder bath at 260° C., and the performance of the test piece was evaluated by visual observation of the external appearance, and by conducting a peel test by performing three peeling operations using an adhesive tape.

Evaluation Criteria:

○○: no anomalies in external appearance, and no portions peeled off using sellotape (a registered trademark)

○: no anomalies in external appearance, but some portions peeled off with sellotape (a registered trademark)

x: external appearance anomalies such as swelling or peeling visible, and significant peeling visible using sellotape (a registered trademark)

TABLE 10

| | Applied Example | | | | | |
|---|---|---|---|---|---|---|
| | 1 | 2 | 3 | 4 | 5 | 6 |
| Name of resist ink composition | W-1 | W-2 | W-3 | W-4 | W-5 | W-6 |
| Tack-free drying property 1 | ○ | ○ | ○ | ○ | ○ | ○ |
| Tack-free drying property 2 | ○ | ○ | ○ | ○ | ○ | ○ |
| Developing properties | ○ | ○ | ○ | ○ | ○ | ○ |
| Sensitivity 400 mJ/cm² | 8 | 7 | 7 | 7 | 7 | 9 |
| 600 mJ/cm² | 9 | 8 | 7 | 8 | 8 | 9 |
| 800 mJ/cm² | 10 | 8 | 8 | 8 | 9 | 10 |
| Drying 30 minutes | ○ | ○ | ○ | ○ | ○ | ○ |
| control range 40 minutes | ○ | ○ | ○ | ○ | ○ | ○ |
| 50 minutes | ○ | ○ | ○ | ○ | ○ | ○ |
| Erichsen (mm) | 4.5 | 5.2 | 4.2 | 2.1 | 3.9 | 5.2 |
| Heat resistance of coating film | ○ | ○ | ○ | ○ | ○ | ○○ |

TABLE 11

| | Comparative Applied Example | |
|---|---|---|
| | 1 | 2 |
| Name of resist ink composition | RW-1 | RW-2 |
| Tack-free drying property 1 | X | ○ |
| Tack-free drying property 2 | X | ○ |
| Developing properties | ○ | Δ |
| Sensitivity 400 mJ/cm² | 5 | 6 |
| 600 mJ/cm² | 6 | 6 |
| 800 mJ/cm² | 7 | 7 |
| Drying 30 minutes | ○ | ○ |
| control range 40 minutes | ○ | ○ |
| 50 minutes | ○ | ○ |
| Erichsen (mm) | 0.3 | 0.2 |
| Heat resistance of coating film | X | ○ |

The resist ink compositions (W-1) through (W-6) obtained using the acid pendant branched-polyether resin compositions (III-2) to (III-7) obtained in the examples 2 to 7 all exhibited favorable results for the tack-free drying property evaluations, and all displayed favorable developing properties. Moreover, the sensitivity results were also satisfactory, and the results of the drying control range evaluations showed that developing periods of approximately 50 minutes or longer were possible. In terms of the Erichsen test, the results generally exceeded 4 mm for the examples, indicating excellent adhesion and coating film elongation. In contrast, the resist ink compositions (RW-1) and (RW-2) obtained using the resin (RZ-1) and the resin (RZ-2) obtained in the comparative examples 1 and 3 respectively were unable to yield a composition with favorable balance across the properties described above.

Applied Examples 7 to 9, and Comparative Applied Examples 3 to 4

Using the branched-polyether resin compositions (II-1) to (II-3) obtained in the examples 1 to 3, and the resins (R-1) and (R-3) obtained in the comparative examples 1 and 3, photocurable compositions were prepared as shown below in Table 12, and the tack-free drying properties and the folding resistance of the photocurable compositions were evaluated in accordance with the evaluation methods described below. The results obtained are shown in Table 12.

(7) Tack-free Drying Property 3

Each photocurable resin composition was applied with an applicator to a tin sheet substrate, in sufficient quantity to form a dried coating film thickness of 40 μm, the composition was dried by heating at 90° C. for 30 minutes, and following cooling to room temperature (23° C.), the tackiness of the coating film to finger touch was evaluated using the following criteria.

Evaluation Criteria:

O: no tackiness detected

Δ: slight tackiness detected x: tackiness detected (8) Folding Resistance

Tin sheets (test pieces) were prepared by using an applicator to apply each of the photocurable resin compositions in sufficient quantity to form a dried coating film thickness of 40 μm, each test piece was dried for 30 minutes in a 90° C. dryer, subsequently irradiated with ultraviolet light with an accumulated intensity of 1,000 mJ/cm² using a 7 kW metal halide lamp (HTE-106-M07, manufactured by Hi-Tech Co., Ltd.), and following confirmation of the curability by finger touch, the cured coating film was cut into strips of width 1 cm and length 5 cm, which were then separated from the tin sheet. These strip-shaped cured coating films were folded lengthwise through 180° so that the coating film surfaces contacted, and the presence of film fracture was evaluated using the following criteria.

Evaluation Criteria:

O: none of the 4 strip-shaped cured coating films fractured

Δ: either 1 or 2 of the 4 strip-shaped cured coating films fractured x: 3 or more of the 4 strip-shaped cured coating films fractured

TABLE 12

|  | Applied Example | | | Comparative Applied Example | |
| --- | --- | --- | --- | --- | --- |
|  | 7 | 8 | 9 | 3 | 4 |
| II-1 (solid fraction) (parts) | 95 |  |  |  |  |
| II-2 (solid fraction) (parts) |  | 95 |  |  |  |
| II-3 (solid fraction) (parts) |  |  | 95 |  |  |
| R-1 (solid fraction) (parts) |  |  |  | 95 |  |
| R-3 (solid fraction) (parts) |  |  |  |  | 95 |
| Irgacure 184 | 5 | 5 | 5 | 5 | 5 |
| Tack-free drying property 3 | ○ | ○ | ○ | X | ○ |
| Folding resistance | ○ | ○ | ○ | X | X |

Reference Example 1

As a model substance, the result of a reaction between phenyl glycidyl ether and acrylic acid is presented below.

Step 1: A flask fitted with a stirrer was charged with 150 g (1 mol) of phenyl glycidyl ether, 57.92 g (0.8 mol) of acrylic acid, and 0.667 g of BHT (2,6-di-tertiarybutyl-4-methylphenol) as a polymerization inhibitor, and the temperature was then raised to 130° C. under constant stirring. At the point where the temperature reached 130° C., the acid value was 0.3 mgKOH/g and the acrylic acid had almost completely disappeared.

Figure 3:
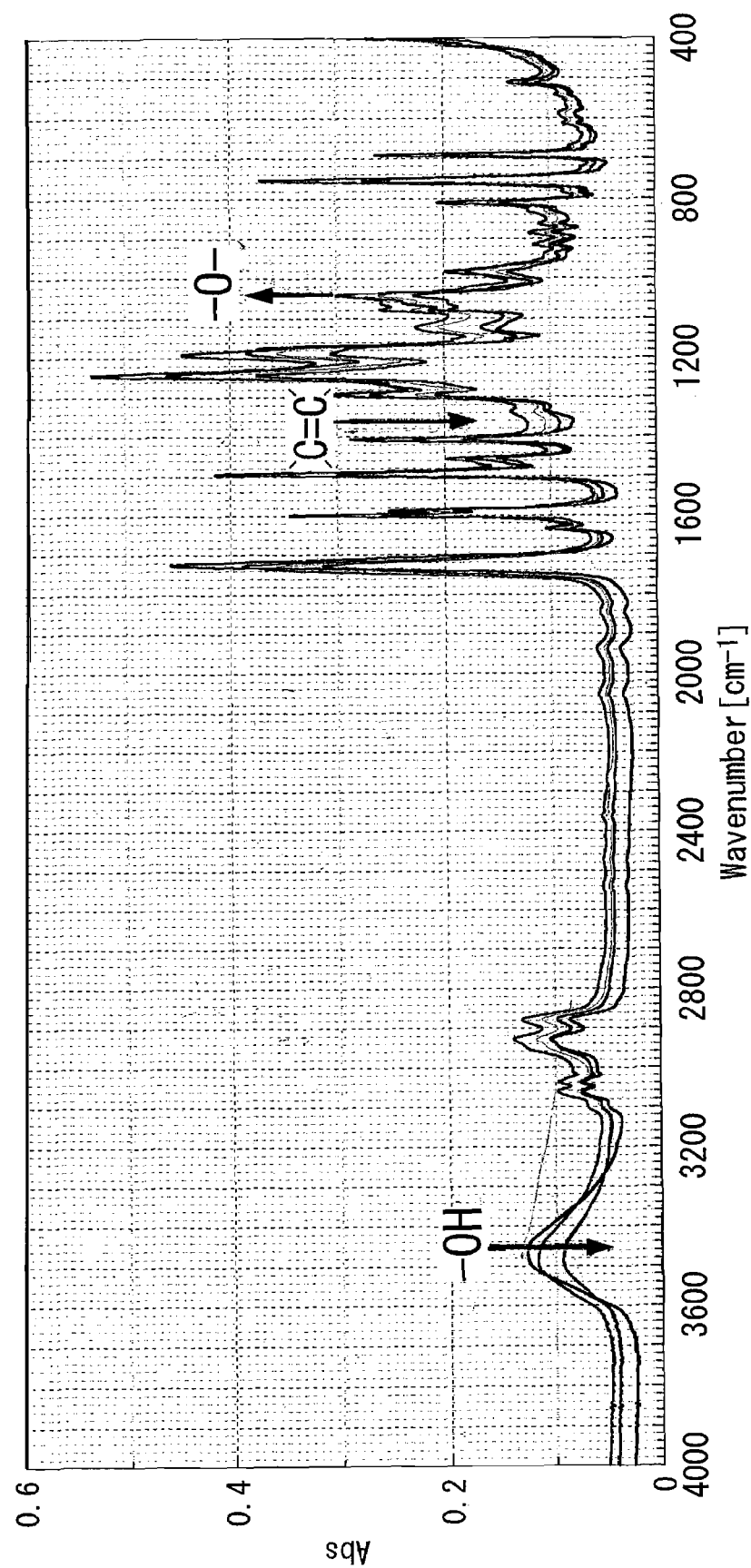
FIG. 3 is an infrared absorption spectrum showing the change over time in the reaction products in a reference example 1.

Step 2: When the reaction was continued, the viscosity of the system increased. The infrared absorption spectra 2 hours, 3 hours, and 4 hours after reaction initiation are shown in FIG. 3. From the spectra it was evident that, in a similar manner to the example 2, the quantity of hydroxyl groups and carbon-carbon double bonds had decreased, whereas the quantity of ether linkages had increased. Reaction at 130° C. was conducted for 5 hours, and the resulting polyether resin composition (PPGE-A) containing a polymer of the phenyl glycidyl ether acrylate (a polyether resin, hereafter abbreviated as PPGE-A) was then extracted from the flask. The results of GPC analysis confirmed that within the composition PPGE-A, a polymerization reaction had proceeded, generating pentamers and higher level components.

In addition, when a structural determination was conducted using $^{13}$C-NMR, it was found that the acrylate of the phenyl glycidyl ether had undergone polymerization via a reaction represented by the reaction scheme shown below.

(Step 1)

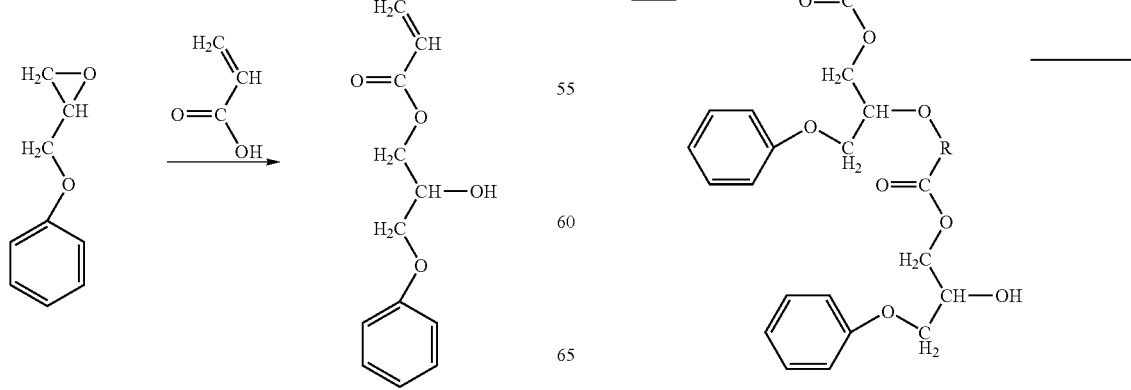

(Step 2)

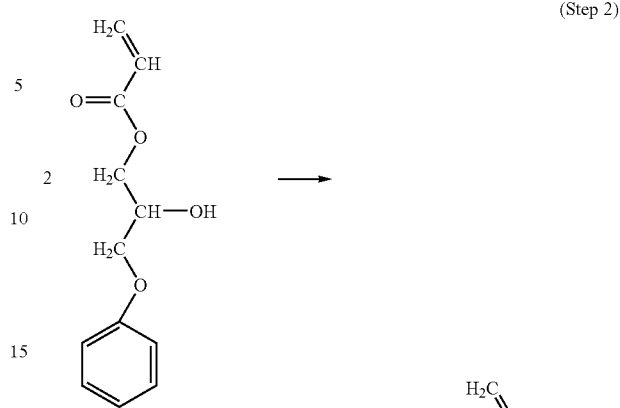

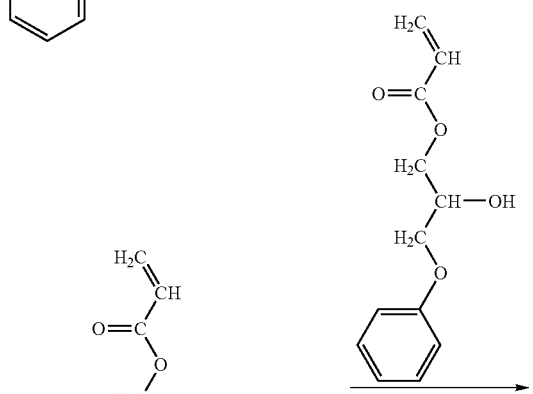

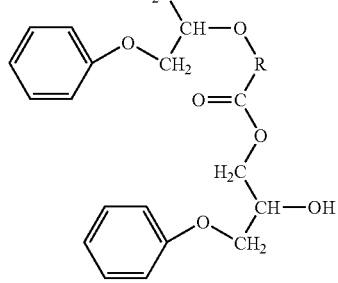

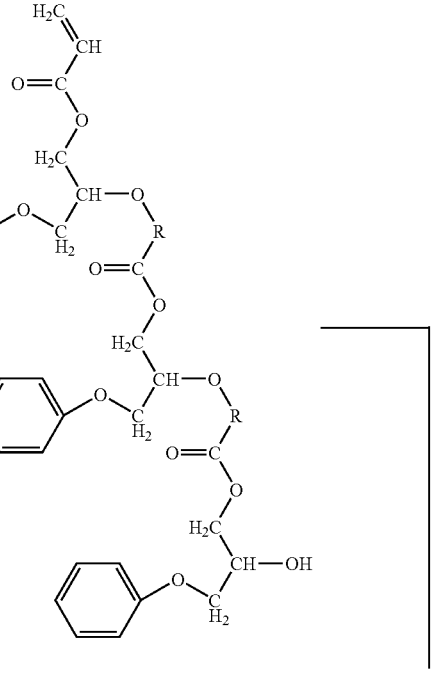

-continued

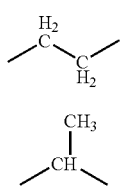
→ Polymer

[wherein, each R group represents, independently, either one of the two linkage groups represented by structural formulas (1) and (2) shown below]

$$\diagup{}^{H_2}_{C}\diagdown_{\substack{C\\H_2}}\diagup \qquad (1)$$

$$\diagup{}^{CH_3}_{CH}\diagdown \qquad (2)$$

Comparative Reference Example 1

As a comparative reference, the same method as above was used to charge a flask with 150 g (1 mol) of phenyl glycidyl ether, 72.4 g (1 mol) of acrylic acid, and 0.667 g of BHT (2,6-di-tertiary-butyl-4-methylphenol) as a polymerization inhibitor, and the temperature was then raised to 130° C. under constant stirring. Three hours after the point where the temperature reached 130° C., the acid value was 0.35 mgKOH/g and the acrylic acid had disappeared. Continuation of the reaction resulted in no increase in the viscosity.

INDUSTRIAL APPLICABILITY

According to a production method of the present invention, a method for producing a branched-polyether resin composition can be provided that is capable of forming coating materials or adhesives or the like that exhibit superior tack-free drying properties during film formation, and excellent flexibility of the cured film, and a method for producing an acid pendant branched-polyether resin composition can also be provided that is capable of forming resist inks and the like that exhibit superior levels of tack-free drying properties during film formation, developing properties, and flexibility of the cured film. Accordingly, the present invention is very useful industrially.

The invention claimed is:

1. A method for producing a branched-polyether resin composition, comprising:
    a first step of conducting a reaction within a mixture comprising:
    (1-1) a diacrylate (A2) of an aromatic difunctional epoxy resin,
    (1-2) (1-2-1) a monoacrylate (A1) of an aromatic difunctional epoxy resin,
    and, optionally,
        (1-2-2) an aromatic difunctional epoxy resin (B) other than said (A1) and said (A2), and
    (1-3) a phosphorus-based catalyst (C),
    either between a hydroxyl group and an acryloyl group within said diacrylate (A2) of an aromatic difunctional epoxy resin, or between a hydroxyl group and an acryloyl group within said diacrylate (A2) of an aromatic difunctional epoxy resin and said monoacrylate (A1) of an aromatic difunctional epoxy resin,
    thereby obtaining a reaction mixture comprising:
    (1-A) a branched-polyether resin (X) containing a hydroxyl group, an acryloyl group and an epoxy group, and
    (1-B) at least one resin component selected from the group consisting of
        (1-B-1) a diacrylate (A2) of an aromatic difunctional epoxy resin,
        (1-B-2) a monoacrylate (A1) of an aromatic difunctional epoxy resin,
    and
        (1-B-3) an aromatic difunctional epoxy resin (B) other than said (A1) and said (A2); and
    a second step of mixing said reaction mixture and an unsaturated monocarboxylic acid, and reacting an epoxy group in said reaction mixture with a carboxyl group in said unsaturated monocarboxylic acid thereby yielding a branched polyether resin (Y) containing a hydroxyl group and an acryloyl group-containing unsaturated monocarboxylate ester structure, such that the method forms a branched polyether resin composition (II) containing the branched polyether (Y) and a di(unsaturated monocarboxylate) ester of an aromatic difunctional epoxy resin.

2. A method for producing a branched-polyether resin composition according to claim 1, wherein a mixture used in said first step is obtained by reacting an aromatic difunctional epoxy resin (b) with acrylic acid (a) in presence of a phosphorus-based catalyst (C), under conditions where epoxy groups within said aromatic difunctional epoxy resin (b) exist in an excess relative to carboxyl groups within said acrylic acid (a).

3. A method for producing a branched-polyether resin composition according to claim 1, wherein said first step uses a mixture comprising:
    (1-1) a diacrylate (A2) of an aromatic difunctional epoxy resin,
    (1-2-1) a monoacrylate (A1) of an aromatic difunctional epoxy resin, and
    (1-3) a phosphorus-based catalyst (C),
    obtained by reacting an aromatic difunctional epoxy resin (b) with acrylic acid (a) in presence of a phosphorus-based catalyst (C), under conditions where epoxy groups within said aromatic difunctional epoxy resin (b) exist in an excess relative to carboxyl groups within said acrylic acid (a),
    and within said mixture, a reaction is conducted between a hydroxyl group and an acryloyl group within said diacrylate (A2) of an aromatic difunctional epoxy resin and said monoacrylate (A1) of an aromatic difunctional epoxy resin, thereby yielding a reaction mixture comprising:
    (1-A) a branched-polyether resin (X) containing a hydroxyl group, an acryloyl group and an epoxy group, and
    (1-B) at least one resin component selected from the group consisting of
        (1-B-1) a diacrylate (A2) of an aromatic difunctional epoxy resin, and
        (1-B-2) a monoacrylate (A1) of an aromatic difunctional epoxy resin.

4. A method for producing a branched-polyether resin composition according to claim 1, wherein a mixture that further comprises a methacryloyl group is used as said mixture used in said first step.

5. A method for producing a branched-polyether resin composition according to claim 4, wherein said first step uses a mixture comprising:
- (1-1) a di(meth)acrylate (A2') of an aromatic difunctional epoxy resin,
- (1-2) (1-2-1) a mono(meth)acrylate (A1') of an aromatic difunctional epoxy resin, and optionally,
  - (1-2-2) an aromatic difunctional epoxy resin (B') other than said (A1') and said (A2'),
and
- (1-3) a phosphorus-based catalyst (C),
obtained by reacting an aromatic difunctional epoxy resin (b) with acrylic acid (a) and methacrylic acid (a') in presence of a phosphorus-based catalyst (C), under conditions where epoxy groups within said aromatic difunctional epoxy resin (b) exist in an excess relative to carboxyl groups within a combination of said acrylic acid (a) and said methacrylic acid (a'),
and within said mixture, a reaction is conducted between a hydroxyl group and an acryloyl group within said di(meth)acrylate (A2') of an aromatic difunctional epoxy resin, or between a hydroxyl group and an acryloyl group within said di(meth)acrylate (A2') of an aromatic difunctional epoxy resin and said mono(meth)acrylate (A1') of an aromatic difunctional epoxy resin, thereby yielding a reaction mixture comprising:
- (1-A) a branched-polyether resin (X) containing a hydroxyl group, an acryloyl group and an epoxy group, and
- (1-B) at least one resin component selected from the group consisting of
  - (1-B-1) a di(meth)acrylate (A2') of an aromatic difunctional epoxy resin,
  - (1-B-2) a mono(meth)acrylate (A1') of an aromatic difunctional epoxy resin, and
  - (1-B-3) an aromatic difunctional epoxy resin (B') other than said (A1) and said (A2).

6. A method for producing a branched-polyether resin composition according to claim 4, wherein said first step uses a mixture comprising:
- (1-1) a di(meth)acrylate (A2') of an aromatic difunctional epoxy resin,
- (1-2-1) a mono(meth)acrylate (A1') of an aromatic difunctional epoxy resin, and
- (1-3) a phosphorus-based catalyst (C),
obtained by reacting an aromatic difunctional epoxy resin (b) with acrylic acid (a) and methacrylic acid (a') in presence of a phosphorus-based catalyst (C), under conditions where epoxy groups within said aromatic difunctional epoxy resin (b) exist in an excess relative to carboxyl groups within a combination of said acrylic acid (a) and said methacrylic acid (a'),
and within said mixture, a reaction is conducted between a hydroxyl group and an acryloyl group within said di(meth)acrylate (A2') of an aromatic difunctional epoxy resin and said mono(meth)acrylate (A1') of an aromatic difunctional epoxy resin, thereby yielding a reaction mixture comprising:
- (1-A) a branched-polyether resin (X) containing a hydroxyl group, an acryloyl group and an epoxy group, and
- (1-B) at least one resin component selected from the group consisting of
  - (1-B-1) a di(meth)acrylate (A2') of an aromatic difunctional epoxy resin, and
  - (1-B-2) a mono(meth)acrylate (A1') of an aromatic difunctional epoxy resin.

7. A method for producing a branched-polyether resin composition according to claim 1, wherein said second step comprises conducting a reaction between said reaction mixture and said unsaturated monocarboxylic acid so that an equivalence ratio between epoxy groups within said reaction mixture and carboxyl groups within said unsaturated monocarboxylic acid (epoxy groups/carboxyl groups) is within a range from 0.9/1 to 1/0.9.

8. A method for producing a branched-polyether resin composition according to claim 7, wherein acrylic acid and/or methacrylic acid is used as said unsaturated monocarboxylic acid.

9. A method for producing a branched-polyether resin composition according to claim 1, wherein an aromatic difunctional epoxy resin (B1) with an epoxy equivalent weight within a range from 135 to 500 g/equivalent is used as said aromatic difunctional epoxy resin (B) and/or said aromatic difunctional epoxy resin (b).

10. A method for producing a branched-polyether resin composition according to claim 9, wherein a dihydroxynaphthalene epoxy resin or a bisphenol epoxy resin is used as said aromatic difunctional epoxy resin (B1).

11. A method for producing a branched-polyether resin composition according to claim 2, wherein said aromatic difunctional epoxy resin (b) and said acrylic acid (a) are reacted together such that an equivalence ratio between epoxy groups within said aromatic difunctional epoxy resin (b) and carboxyl groups within said acrylic acid (a) [(epoxy group equivalent weight)/(carboxyl group equivalent weight)] is within a range from 1.1 to 5.5.

12. A method for producing a branched-polyether resin composition according to claim 5, wherein said aromatic difunctional epoxy resin (b), said acrylic acid (a) and said methacrylic acid (a') are reacted together such that an equivalence ratio between epoxy groups within said aromatic difunctional epoxy resin (b) and carboxyl groups within a combination of said acrylic acid (a) and said methacrylic acid (a') [(epoxy group equivalent weight)/(carboxyl group equivalent weight)] is within a range from 1.1 to 5.0.

13. A method for producing a branched-polyether resin composition according to claim 1, wherein a phosphine-based catalyst is used as said phosphorus-based catalyst (C).

14. A method for producing a branched-polyether resin composition according to claim 1, wherein
- a weight average molecular weight of a resin component [said branched-polyether resin (X), together with at least one resin component selected from the group consisting of a diacrylate (A2) of an aromatic difunctional epoxy resin, a monoacrylate (A1) of an aromatic difunctional epoxy resin, and an aromatic difunctional epoxy resin (B)] of said reaction mixture is within a range from 1,000 to 50,000, and
- a reaction between a hydroxyl group and an acryloyl group within said diacrylate (A2) of an aromatic difunctional epoxy resin and said monoacrylate (A1) of an aromatic difunctional epoxy resin is conducted such that an epoxy equivalent weight of said resin component falls within a range from 250 to 10,000.

15. A method for producing an acid pendant branched-polyether resin composition comprising: mixing a branched-polyether resin composition obtained using a method for producing a branched-polyether resin composition according to claim 1 with a polycarboxylic acid anhydride so as to react a hydroxyl group within said branched-polyether resin composition and an acid anhydride group within said polycarboxylic acid anhydride.

16. A method for producing an acid pendant branched-polyether resin composition according to claim 15, wherein a reaction is conducted between a hydroxyl group within said branched-polyether resin composition and an acid anhydride group within said polycarboxylic acid anhydride until an acid value of a resulting resin solid fraction reaches a value within a range from 50 to 120 mgKOH/g.

17. A method for producing an acid pendant branched-polyether resin composition according to claim 15, wherein an aliphatic dicarboxylic acid anhydride is used as said polycarboxylic acid anhydride.

* * * * *